(12) United States Patent
Yamamuro et al.

(10) Patent No.: US 8,555,628 B2
(45) Date of Patent: Oct. 15, 2013

(54) VARIABLE DISPLACEMENT PUMP AND POWER STEERING APPARATUS USING THE VARIABLE DISPLACEMENT PUMP

(75) Inventors: Shigeaki Yamamuro, Zushi (JP); Makoto Tada, Zama (JP); Satoshi Nonaka, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 994 days.

(21) Appl. No.: 12/615,572

(22) Filed: Nov. 10, 2009

(65) Prior Publication Data

US 2010/0205952 A1    Aug. 19, 2010

(30) Foreign Application Priority Data

Feb. 17, 2009 (JP) .................................. 2009-033412

(51) Int. Cl.
*F16D 31/02* (2006.01)
(52) U.S. Cl.
USPC .................... 60/445; 418/24; 418/26; 418/30
(58) Field of Classification Search
USPC ......... 60/445; 418/16, 24, 26, 27, 30; 417/50; 180/417, 421, 422, 423, 428
See application file for complete search history.

(56) References Cited

U.S. PATENT DOCUMENTS

| 4,913,102 | A  | * | 4/1990  | Ohmura et al. ............ 123/41.12 |
| 6,736,604 | B2 |   | 5/2004  | Okada et al. |
| 2002/0192081 | A1 | * | 12/2002 | Okada et al. .................. 417/213 |
| 2007/0212243 | A1 | * | 9/2007  | Yamamuro et al. ............ 418/30 |

FOREIGN PATENT DOCUMENTS

| JP | 07-232655 A | 9/1995 |
| JP | 09-263255 A | 10/1997 |
| JP | 2001-294166 A | 10/2001 |
| JP | 2003-072569 A | 3/2003 |
| JP | 2007-092761 A | 4/2007 |

* cited by examiner

*Primary Examiner* — Edward Look
*Assistant Examiner* — Logan Kraft
(74) *Attorney, Agent, or Firm* — Foley & Lardner LLP

(57) ABSTRACT

A variable displacement pump including a drive shaft, a cam ring eccentrically moveable with respect to an axis of the drive shaft, and a solenoid drivingly controlled on the basis of variation in electric current amount to be supplied to the solenoid which is controlled in accordance with an operating condition of a vehicle. The solenoid is configured such that a rate of change in the specific discharge amount relative to the electric current amount to be supplied to the solenoid under a condition that the specific discharge amount is smaller is reduced as compared to a rate of change in the specific discharge amount relative to the electric current amount to be supplied to the solenoid under a condition that the specific discharge amount is larger.

2 Claims, 22 Drawing Sheets

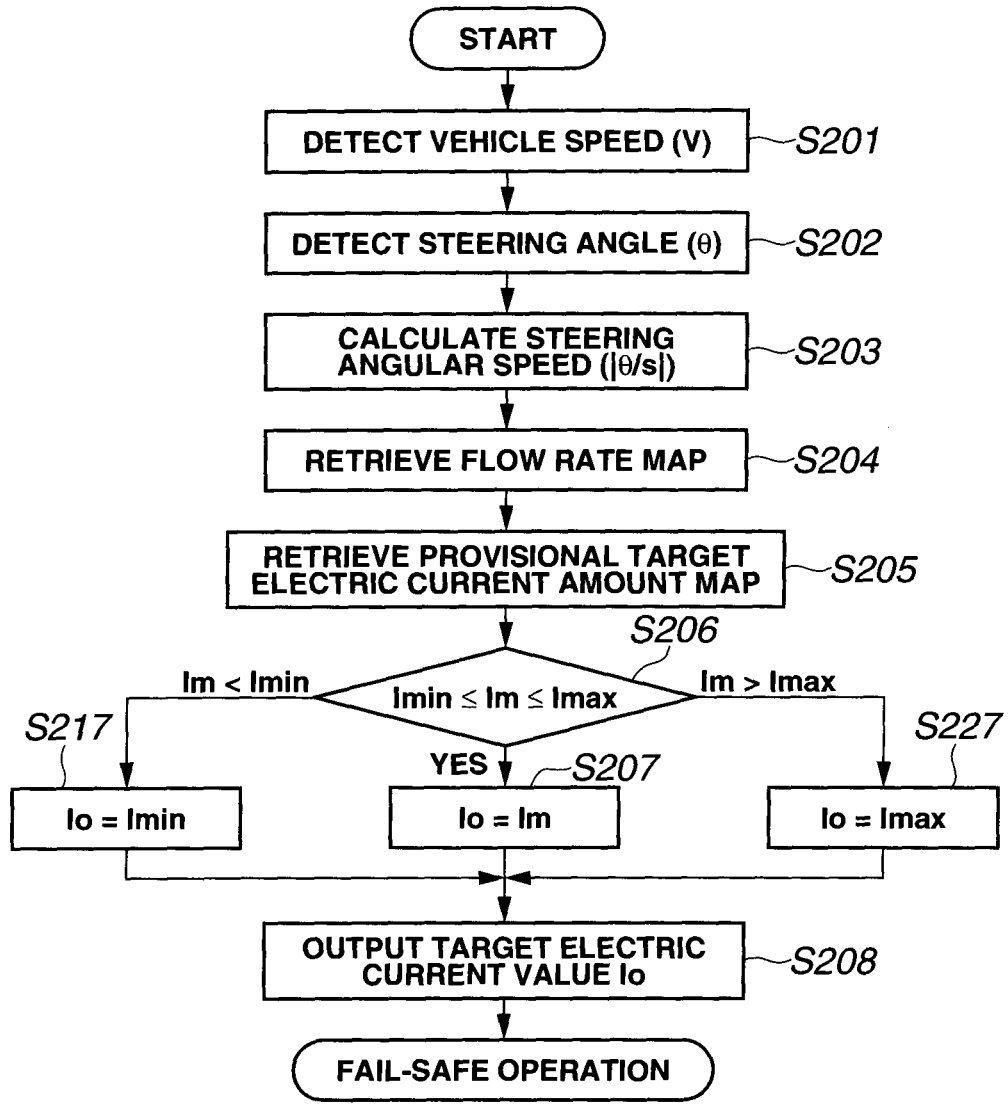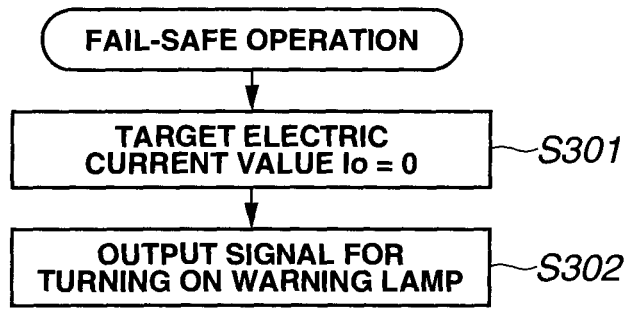

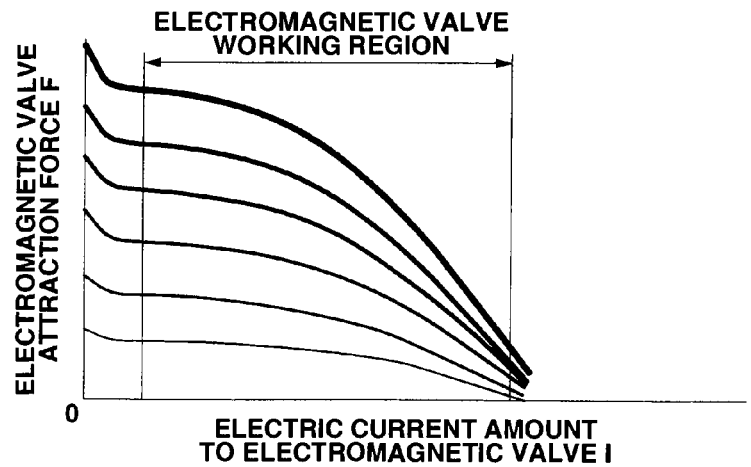
FIG.33
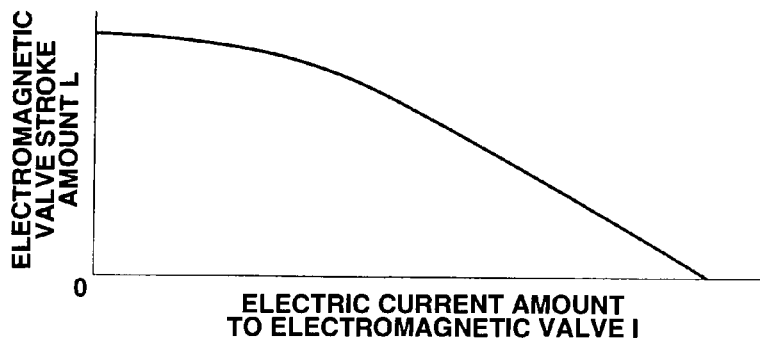
FIG.34
FIG.35
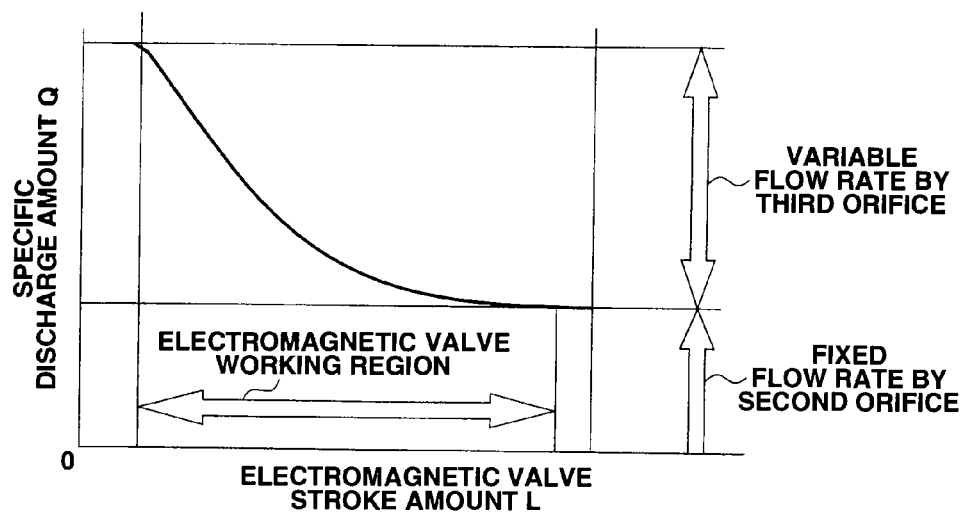

VARIABLE DISPLACEMENT PUMP AND POWER STEERING APPARATUS USING THE VARIABLE DISPLACEMENT PUMP

BACKGROUND OF THE INVENTION

The present invention relates to a power steering apparatus for vehicles and a variable displacement pump for supplying a working fluid to the power steering apparatus.

Japanese Patent Application First Publication No. 2007-92761 discloses a variable displacement pump for use in a power steering apparatus for vehicles. The variable displacement pump of this conventional art includes a control valve for controlling an eccentric amount of a cam ring with respect to a central axis of a drive shaft (i.e., a pump element), and a solenoid for controlling an axial displacement amount of a valve body of the control valve. The variable displacement pump is constructed to control an amount of axial displacement of an armature of the solenoid by varying an amount of electric current to be supplied to the solenoid in accordance with an operating condition of the vehicle. As a result, the eccentric amount of the cam ring which is determined on the basis of an axial position of the valve body of the control valve is controlled, so that a discharge flow rate per one rotation of the pump (that is, a specific discharge amount of the pump) is varied.

SUMMARY OF THE INVENTION

However, a relationship between change in amount of electric current to be supplied to the solenoid and change in specific discharge amount of the pump is not considered in the variable displacement pump of the above-described conventional art, whereby controllability in discharge flow rate is insufficient in the variable displacement pump of the above-described conventional art.

It is an object of the present invention to solve the above-described technical problem in the conventional art and provide a variable displacement pump which is improved in controllability of a discharge flow rate and a power steering apparatus using the variable displacement pump.

In one aspect of the present invention, there is provided a variable displacement pump for supplying a working fluid to a steering apparatus for a vehicle, the variable displacement pump comprising:
  a pump housing including a pump element accommodating portion therein;
  a drive shaft rotatably supported by the pump housing;
  a cam ring disposed within the pump element accommodating portion so as to be eccentrically moveable with respect to an axis of the drive shaft;
  a pump element disposed on an inner circumferential side of the cam ring, the pump element being driven by the drive shaft to suck, pressurize and discharge the working fluid and vary a specific discharge amount of the working fluid which is a discharge flow rate per one rotation of the pump element in accordance with variation in an eccentric amount of the cam ring with respect to the axis of the drive shaft,
  a suction port that is disposed within the pump housing and opened to a suction area of the pump element;
  a discharge port that is disposed within the pump housing and opened to a discharge area of the pump element; and
  a solenoid that is drivingly controlled on the basis of variation in electric current amount to be supplied to the solenoid which is controlled in accordance with an operating condition of the vehicle, the solenoid being configured to control the eccentric amount of the cam ring,
  wherein the solenoid is configured such that a rate of change in the specific discharge amount relative to the electric current amount to be supplied to the solenoid under a condition that the specific discharge amount is smaller is reduced as compared to a rate of change in the specific discharge amount relative to the electric current amount to be supplied to the solenoid under a condition that the specific discharge amount is larger.

In a further aspect of the present invention, there is provided a variable displacement pump for supplying a working fluid to a steering apparatus for a vehicle, the variable displacement pump comprising:
  a pump housing including a pump element accommodating portion therein;
  a drive shaft rotatably supported by the pump housing;
  a cam ring disposed within the pump element accommodating portion so as to be eccentrically moveable with respect to an axis of the drive shaft;
  a pump element disposed on an inner circumferential side of the cam ring, the pump element being driven by the drive shaft to suck, pressurize and discharge the working fluid and vary a specific discharge amount of the working fluid which is a discharge flow rate per one rotation of the pump element in accordance with variation in an eccentric amount of the cam ring with respect to the axis of the drive shaft,
  a suction port that is disposed within the pump housing and opened to a suction area of the pump element;
  a discharge port that is disposed within the pump housing and opened to a discharge area of the pump element; and
  a solenoid that is drivingly controlled on the basis of variation in electric current amount to be supplied to the solenoid which is controlled in accordance with an operating condition of the vehicle, the solenoid being configured to control the eccentric amount of the cam ring,
  wherein the solenoid is configured such that a rate of change in the specific discharge amount relative to a steering amount of a steering wheel of the steering apparatus under a condition that the specific discharge amount is smaller is reduced as compared to a rate of change in the specific discharge amount relative to the steering amount under a condition that the specific discharge amount is larger.

In a still further aspect of the present invention, there is provided a power steering apparatus for a vehicle, comprising:
  a power cylinder including a pair of fluid pressure chambers and configured to generate a steering force to be transmitted to steered road wheels of the vehicle by using a working fluid supplied to the fluid pressure chambers;
  a pump that supplies the working fluid to the power cylinder; and
  a control valve that selectively supplies the working fluid discharged from the pump to the pair of fluid pressure chambers in accordance with a steering direction and a steering amount of a steering wheel of the vehicle;
  the pump comprising:
    a pump housing including a pump element accommodating portion therein;
    a drive shaft rotatably supported by the pump housing;
    a cam ring disposed within the pump element accommodating portion so as to be eccentrically moveable with respect to an axis of the drive shaft;

a pump element disposed on an inner circumferential side of the cam ring, the pump element being driven by the drive shaft to suck, pressurize and discharge the working fluid and vary a specific discharge amount of the working fluid which is a discharge flow rate per one rotation of the pump element in accordance with variation in an eccentric amount of the cam ring with respect to the axis of the drive shaft, a suction port that is disposed within the pump housing and opened to a suction area of the pump element;

a discharge port that is disposed within the pump housing and opened to a discharge area of the pump element; and a solenoid that is drivingly controlled on the basis of variation in electric current amount to be supplied to the solenoid which is controlled in accordance with an operating condition of the vehicle, the solenoid being configured to control the eccentric amount of the cam ring, wherein the solenoid is configured such that a rate of change in the specific discharge amount relative to the electric current amount to be supplied to the solenoid under a condition that the specific discharge amount is smaller is reduced as compared to a rate of change in the specific discharge amount relative to the electric current amount to be supplied to the solenoid under a condition that the specific discharge amount is larger.

According to the present invention, a rate of change in the specific discharge amount relative to the electric current amount to be supplied to the solenoid is controlled to a small level in a case where the specific discharge amount is small. As a result, it is possible to suppress significant change in discharge flow rate of the pump under the condition that the specific discharge amount is small, and improve controllability of the discharge flow rate of the pump.

Further, according to the present invention, since the power steering apparatus controls the specific discharge amount so as to become small during high speed running of the vehicle, it is possible to alleviate change in discharge flow rate of the variable displacement pump during high speed running of the vehicle owing to the characteristic of a rate of change in the specific discharge amount, which serves for enhancing steering stability of the power steering apparatus.

The other objects and features of this invention will become understood from the following description with reference to the accompanying drawings.

BRIEF DESCRIPTION OF THE DRAWINGS

FIG. 11 is a flowchart showing an operation of controlling the amount of electric current to the electromagnetic valve.

FIG. 12 is a flowchart showing a fail-safe operation for the electromagnetic valve.

FIG. 33 is a graph showing a relationship between stroke amount of the electromagnetic valve and attraction force of the electromagnetic valve in the third embodiment.

FIG. 34 is a graph showing a relationship between amount of electric current to be supplied to the electromagnetic valve and stroke amount of the electromagnetic valve in the third embodiment.

FIG. 35 is a graph showing a relationship between stroke amount of the electromagnetic valve and specific discharge amount of the variable displacement pump in the third embodiment.

DETAILED DESCRIPTION OF THE INVENTION

A variable displacement pump and a power steering apparatus using the variable displacement pump according to embodiments of the present invention are explained hereinafter with reference to the accompanying drawings. In the respective embodiments, the variable displacement pump is applied to a hydraulic power steering apparatus for vehicles. For ease of understanding, various directional terms, such as right, left, upper, lower, rightward and the like are used in the description. However, such terms are to be understood with respect to only a drawing or drawings on which a corresponding part or portion is shown.

Figure 1:
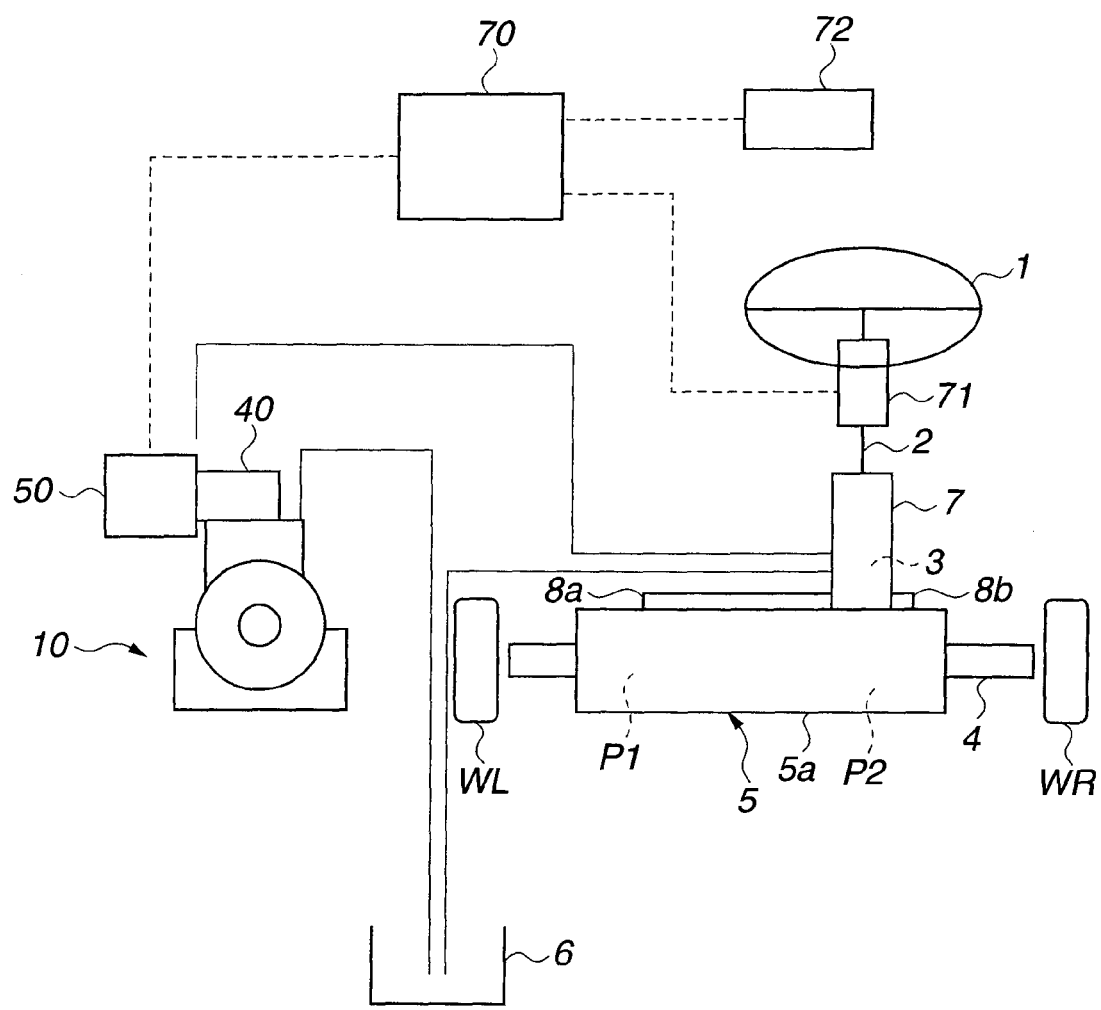
FIG. 1 is a schematic diagram of a power steering apparatus according to a first embodiment of the present invention.

FIG. 1 to FIG. 21 illustrate a first embodiment of the present invention. The hydraulic power steering apparatus to which the variable displacement pump of the present invention (hereinafter referred to as an oil pump) is applied is of a rack and pinion type. As shown in FIG. 1, the hydraulic power steering apparatus includes steering shaft 2 that is connected to steering wheel 1 at one end portion thereof, and pinion shaft 3 having one end portion that is connected to the other end portion of steering shaft 2 via a torsion bar (not shown). Pinion shaft 3 has pinion teeth on an outer circumferential surface of a tip end thereof. The hydraulic power steering apparatus further includes rack shaft 4 having rack teeth that mesh with the pinion teeth of pinion shaft 3 and extend in a predetermined axial area of rack shaft 4. Rack shaft 4 extends in a width direction of the vehicle and has opposite ends that are connected to left and right steered road wheels WL and WR through knuckles (not shown). The hydraulic power steering apparatus further includes power cylinder 5 connected to rack shaft 4 that serves as a piston rod, reservoir tank 6 storing a working oil (i.e., a working fluid) that circulates through power cylinder 5, and oil pump 10 that sucks the working oil from reservoir tank 6 and delivers the working oil pressurized to power cylinder 5. The hydraulic power steering apparatus further includes control valve 7 that is operated to be open and closed resulting from a relative rotation between steering shaft 2 and pinion shaft 3 due to torsional deformation of the torsion bar and controls an amount of the working oil to be supplied to power cylinder 5 on the basis of an amount of the relative rotation between steering shaft 2 and pinion shaft 3 (i.e., an amount of torsion of the torsion bar). The hydraulic power steering apparatus further includes steering angle sensor 71 that is connected to electronic controller 70 installed on the vehicle and detects a steering angle (i.e., a steering amount) of steering wheel 1.

In the thus-constructed power steering apparatus, as pinion shaft 3 rotates following steering wheel 1, rack shaft 4 is displaced in the axial direction to change orientation of steered road wheels WL and WR. At this time, a hydraulic pressure that is produced corresponding to rotational torque (i.e., steering torque) of steering wheel 1 in accordance with a steering operation of a vehicle driver is applied into power cylinder 5. The steering operation of the vehicle driver is assisted by the application of the hydraulic pressure into power cylinder 5.

Power cylinder 5 includes cylinder tube 5a having a generally cylindrical shape, and a piston (not shown) that is disposed within cylinder tube 5a so as to be moveable in an axial direction of cylinder tube 5a. An inside space of cylinder tube 5a is divided into first fluid pressure chamber P1 on the left side of FIG. 1 and second fluid pressure chamber P2 on the right side of FIG. 1 by the piston. First pipe 8a and second pipe 8b are connected to outer circumferential peripheries of opposite axial end portions of power cylinder 5 and communicate first fluid pressure chamber P1 and second fluid pressure chamber P2 with control valve 7, respectively. Control valve 7 selectively supplies the working oil to one of first fluid pressure chamber P1 and second fluid pressure chamber P2 and circulates and returns the working oil within the other thereof to reservoir tank 6.

Figure 2:
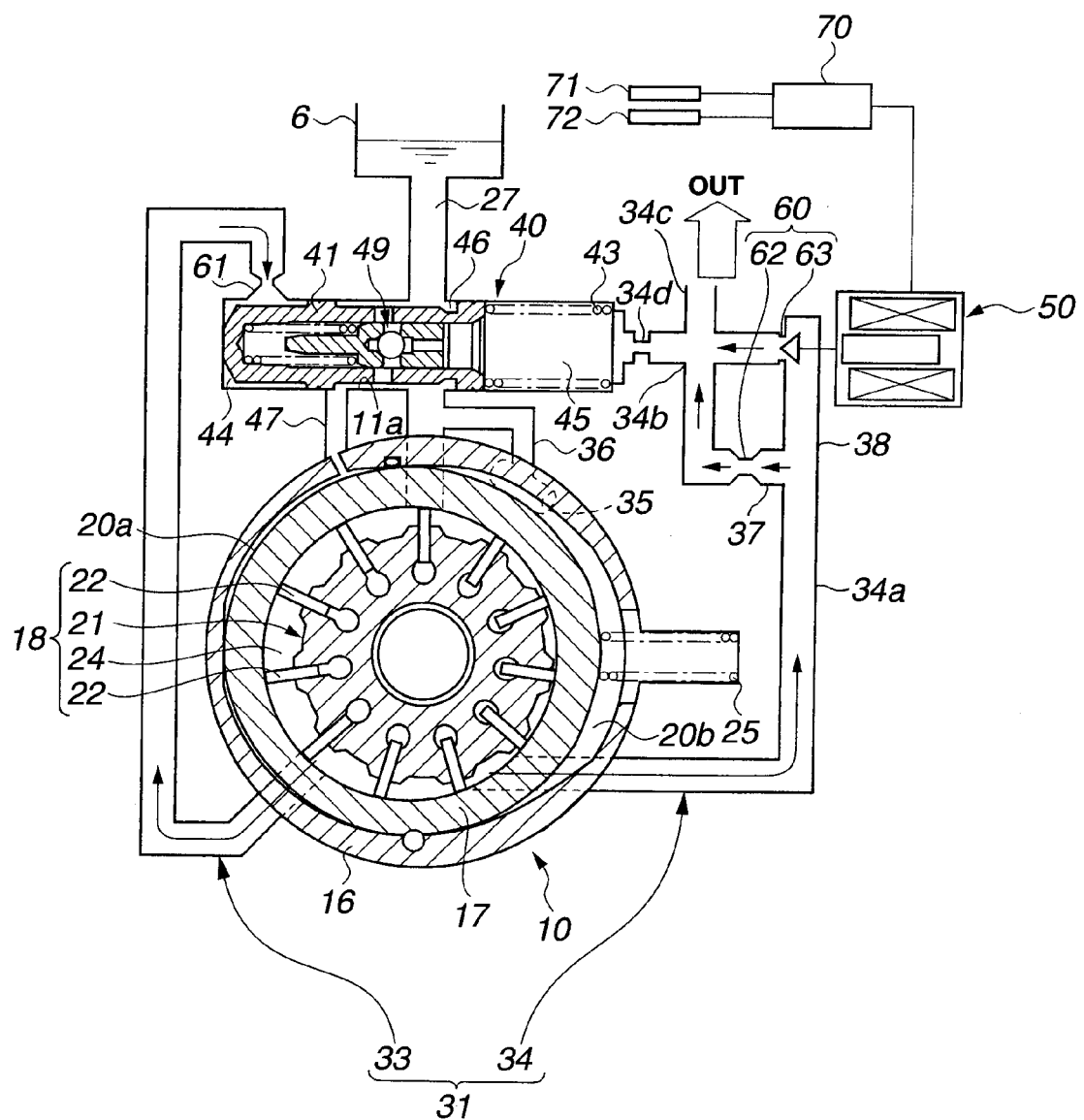
FIG. 2 is a schematic diagram of a variable displacement pump according to the first embodiment.
Figure 3:
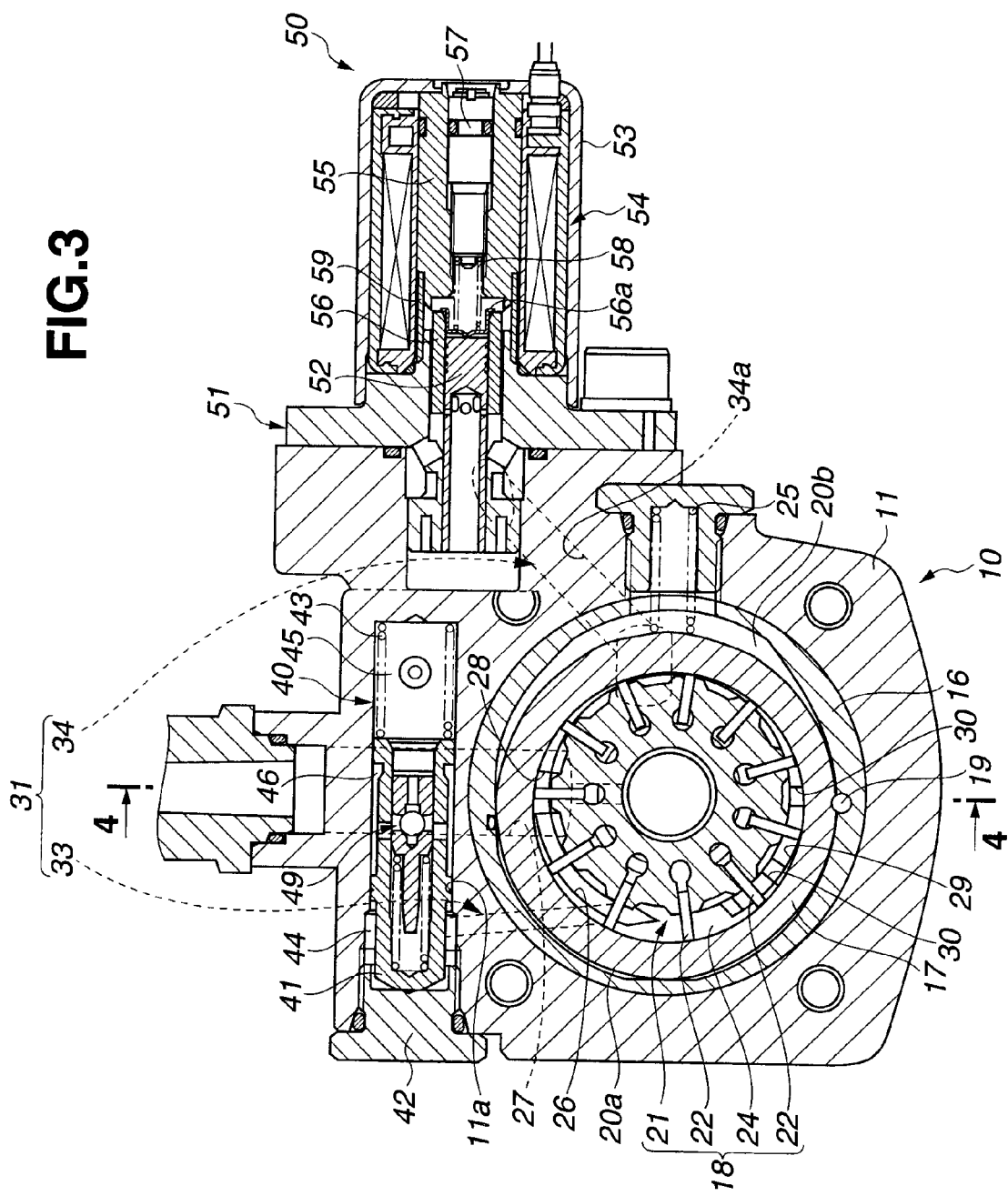
FIG. 3 is a cross section taken along line 3-3 shown in FIG. 4.
Figure 4:
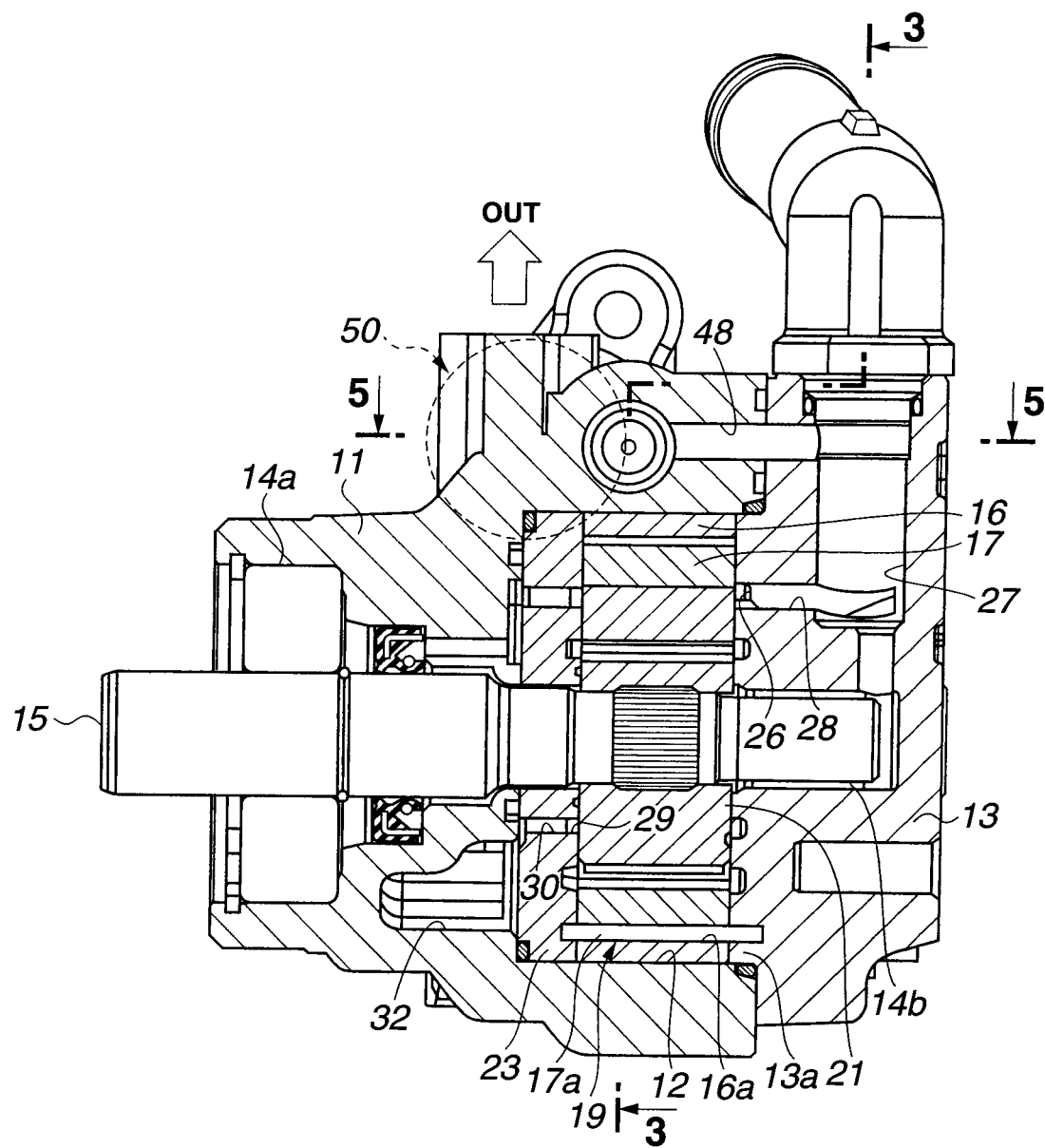
FIG. 4 is a cross section taken along line 4-4 shown in FIG. 3.

As shown in FIG. 2 to FIG. 5, oil pump 10 includes a pump housing formed by pump body 11 and cover member 13, drive shaft 15 rotatably supported by the pump housing, generally annular adapter ring 16 disposed within pump body 11, generally annular cam ring 17 moveably disposed on an inner circumferential side of adapter ring 16, pump element 18 disposed on an inner circumferential side of cam ring 17, control valve 40 that controls a discharge flow rate (i.e., a specific discharge amount) which is a rate of the working oil to be discharged per one rotation of pump element 18, and electromagnetic valve (i.e., solenoid) 50 that controls an amount of axial displacement of valve body 41 of control valve 40. The pump housing is made of an aluminum alloy. Pump body 11 has pump element accommodating portion 12 that is formed as a generally cylindrical space on an inner circumferential side of one axial end portion of pump body 11 and is open to an axial end surface of pump body 11. Cover member 13 is disposed at the axial end of pump body 11 and covers pump element accommodating portion 12. Drive shaft 15 is rotatably supported by first bearing 14a and second bearing 14b which are respectively arranged on an inner circumferential side of the other axial end portion of pump body 11 and an inner circumferential side of cover member 13 as shown in FIG. 4. Drive shaft 15 is rotationally driven by a driving force of an engine (not shown). Adapter ring 16 is fitted onto a circumferential wall of pump element accommodating portion 12. Cam ring 17 is so disposed as to be eccentrically moveable with respect to a central axis of drive shaft 15. Pump element 18 is driven to rotate in a counterclockwise direction in FIG. 3 by drive shaft 15, thereby performing a pump operation.

As shown in FIG. 4, adapter ring 16 includes pin holding groove 16a that is formed at a predetermined circumferential position on an inner circumferential surface of adapter ring 16. Pin holding groove 16a continuously extends in an axial direction of adapter ring 16 and holds bar-shaped swing fulcrum pin 19 that serves as a fulcrum of a swing movement of cam ring 7. A seal member is disposed on the inner circumferential surface of adapter ring 16 so as to be substantially opposed to swing fulcrum pin 19 in a radial direction of adapter ring 16. The seal member extends in the axial direction of adapter ring 16. Swing fulcrum pin 19 and the seal member cooperate with each other to define first fluid pressure chamber 20a and second fluid pressure chamber 20b between adapter ring 16 and cam ring 17. In other words, a radial space between adapter ring 16 and cam ring 17 is divided into first fluid pressure chamber 20a and second fluid pressure chamber 20b by swing fulcrum pin 19 and the seal member.

Cam ring 17 is made of a so-called sintered material which is formed by sintering an iron-based metal material. Cam ring 17 has support groove 17a on an outer circumferential surface thereof. Support groove 17a having a generally semi-circular cross section extends in an axial direction of cam ring 17 and receives swing fulcrum pin 19. Cam ring 17 is supported by swing fulcrum pin 19 so as to be swingable about swing fulcrum pin 19 as the fulcrum toward first fluid pressure chamber 20a or second fluid pressure chamber 20b.

Pump element 18 is fixed to an outer circumferential surface of drive shaft 15. Pump element 18 includes rotor 21 that is rotatably disposed on the inner circumferential side of cam ring 17, and a plurality of rectangular plate-shaped vanes 22 that are disposed in slots 21a of rotor 21. Slots 21a are formed on an outer circumferential portion of rotor 21 and extend along a radial direction of rotor 21. Vanes 22 are moveably supported in slots 21a so as to project from slots 21a and retreat into slots 21a. As shown in FIG. 4, pump element 18 is disposed between an end surface of protrudent portion 13a of cover member 13 and an end surface of generally disk-shaped pressure plate 23 in a substantially sandwiched state therebetween. Protrudent portion 13a extends from an inside portion of the end surface of cover member 13 into pump element accommodating portion 12 of pump body 11. Pressure plate 23 is sandwiched between a bottom surface of pump element accommodating portion 12 and an end surface of adapter ring 16.

A plurality of pump chambers 24 are defined by adjacent two vanes 22, 22 in a space formed between cam ring 17 and rotor 21. Volumes of respective pump chambers 24 can be varied by swinging cam ring 17 about swing fulcrum pin 19.

As shown in FIG. 3, coil spring 25 is partly disposed in second fluid pressure chamber 20b. One end of coil spring 25 is elastically supported by a bolt-shaped spring retainer that is screwed into pump body 11. Cam ring 17 is always biased by coil spring 25 pre-loaded by the spring retainer toward a side of first fluid pressure chamber 20a, that is, in such a direction as to maximize the volumes of respective pump chambers 24.

As shown in FIG. 4, protrudent portion 13a of cover member 13 has suction port 26 on the end surface thereof. Suction port 26 is formed at a portion of the end surface of protrudent portion 13a corresponding to a so-called suction area in which the volumes of respective pump chambers 24 are gradually increased with rotation of rotor 21. As shown in FIG. 3, suction port 26 is in the form of an arcuate cut-out extending along a circumferential direction of protrudent portion 13a. Suction port 26 is communicated with suction hole 28 that is located at a central portion of suction port 26 and opened to suction passage 27. Suction passage 27 is formed in cover member 13 along a radial direction of protrudent portion 13a and connected to reservoir tank 6. The working oil that is introduced into suction passage 27 from reservoir tank 6 is supplied into respective pump chambers 24 through suction hole 28.

On the other hand, pressure plate 23 has discharge port 29 on an end surface thereof which is opposed to rotor 21. Discharge port 29 is disposed in a substantially axisymmetric position relative to suction port 26 and in a so-called discharge area in which the volumes of respective pump chambers 24 are gradually decreased with rotation of rotor 21. Discharge port 29 is in the form of an arcuate cut-out extending along a circumferential direction of pressure plate 23. Discharge port 29 is communicated with a plurality of discharge holes 30 which are opened to predetermined portions of discharge port 29. Discharge holes 30 are communicated with discharge passage 31 for feeding the working oil discharged into discharge port 29 to an outside of discharge port 29.

Discharge passage 31 includes pressure chamber 32 to which discharge holes 30 are opened as shown in FIG. 4, first connecting passage 33 and second connecting passage 34 as shown in FIG. 3. Specifically, discharge passage 31 is bifurcated into first connecting passage 33 and second connecting passage 34 via pressure chamber 32. First connecting passage 33 introduces a part of the working oil discharged into pressure chamber 32, to one pressure chamber (i.e., high pressure chamber 44 as explained later) which is defined by valve body 41 of control valve 40. Second connecting passage 34 feeds the working oil in pressure chamber 32 to an outside of pressure chamber 32. Electromagnetic valve 50 is disposed on a side of a terminal end of second connecting passage 34.

Figure 5:
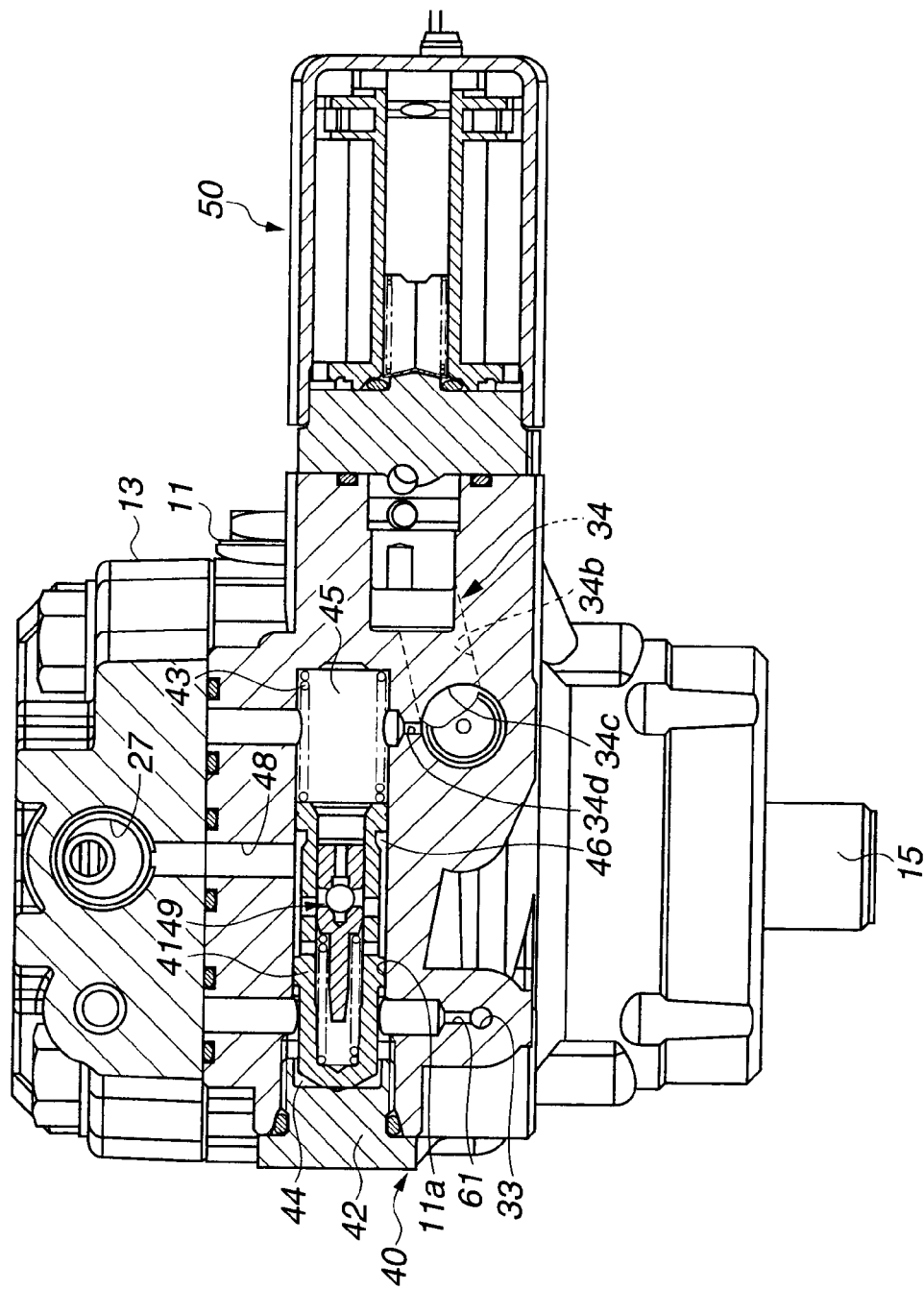
FIG. 5 is a cross section taken along line 5-5 shown in FIG. 4.

As shown in FIG. 3 to FIG. 5, control valve 40 is disposed within an upper end portion of pump body 11 on a side of an axial end of pump body 11 along a direction perpendicular to drive shaft 15. Control valve 40 includes valve body 41 slidably disposed within valve bore 11a, valve spring 43 that biases valve body 41 toward plug 42, high pressure chamber 44 formed between plug 42 and one axial end of valve body 41, and intermediate pressure chamber 45 that is formed between the other axial end of valve body 41 and a bottom of valve bore 11a and accommodates valve spring 43 therein. Specifically, as shown in FIG. 2 and FIG. 3, valve bore 11a is formed in the upper end portion of pump body 11 on the side of the axial end of pump body 11. Valve spring 43 biases valve body 41 leftward in FIG. 2, FIG. 3 and FIG. 5 so as to come into contact with plug 42 that is screwed into an open end of valve bore 11a. High pressure chamber 44 receives a hydraulic pressure upstream of metering orifice 60 that is disposed within electromagnetic valve 50 as explained later, that is, a part of the working oil discharged into pressure chamber 32 via first connecting passage 33. Intermediate pressure chamber 45 receives a hydraulic pressure downstream of metering orifice 60, that is, the working oil in pressure chamber 32 via second connecting passage 34 through communicating throttle 34d as explained later. When a pressure difference between high pressure chamber 44 and intermediate pressure chamber 45 becomes a predetermined value or more, valve body 41 is caused to move rightward in FIG. 3 against a spring force of valve spring 43. Control valve 40 controls a control pressure for controlling an eccentric amount of cam ring 17 on the basis of a pressure difference between an upstream side of metering orifice 60 and a downstream side of metering orifice 60.

As shown in FIG. 2, first orifice 61 is disposed at a terminal end of first connecting passage 33. First orifice 61 has a reduced diameter smaller than a diameter of first connecting passage 33. First orifice 61 can reduce influence due to hydraulic pulsation of the working oil that is to be introduced into high pressure chamber 44 and serve as a damper that suppresses hydraulic vibration of valve body 41.

When valve body 41 is placed on the left side in FIG. 3, first fluid pressure chamber 20a is connected to low pressure chamber 46 that is defined on an outer circumferential side of valve body 41, via communicating oil passage 47 that communicates first fluid pressure chamber 20a and valve bore 11a. As shown in FIG. 5, low pressure chamber 46 is connected to low pressure passage 48 that is branched from suction passage 27. Therefore, the working oil having a low pressure is introduced from suction passage 27 into first fluid pressure chamber 20a through low pressure passage 48.

In contrast, when valve body 41 is caused to move to the right side in FIG. 3 due to the pressure difference between high pressure chamber 44 and intermediate pressure chamber 45, first fluid pressure chamber 20a is prevented from being fluidly communicated with low pressure chamber 46 and is fluidly communicated with high pressure chamber 44. Therefore, the working oil having a high pressure is introduced into first fluid pressure chamber 20a. That is, the hydraulic pressure in lower pressure chamber 46 and the hydraulic pressure on the upstream side of metering orifice 60 are selectively supplied into first fluid pressure chamber 20a.

As shown in FIG. 2 and FIG. 3, control valve 40 further includes relief valve 49 that is disposed within valve body 41. In a case where a pressure within intermediate pressure chamber 45 reached a predetermined value or more, that is, in a case where a pressure on a side of load (i.e., on a side of the power steering apparatus) reached the predetermined value or more, relief valve 49 is opened to circulate a part of the working oil to suction passage 27 via low pressure passage 48.

On the other hand, as shown in FIG. 2, second fluid pressure chamber 20b is communicated with suction passage 27 via communicating passage 36. Communicating passage 36 is connected with arcuate suction pressure introducing port 35 that is opened to second fluid pressure chamber 20b. Therefore, the hydraulic pressure on the suction side (i.e., a low pressure) is always introduced into second fluid pressure chamber 20b. As a result, cam ring 17 is always urged toward a side of first fluid pressure chamber 20a by the hydraulic pressure on the suction side and the biasing force of coil spring 25.

Figure 6:
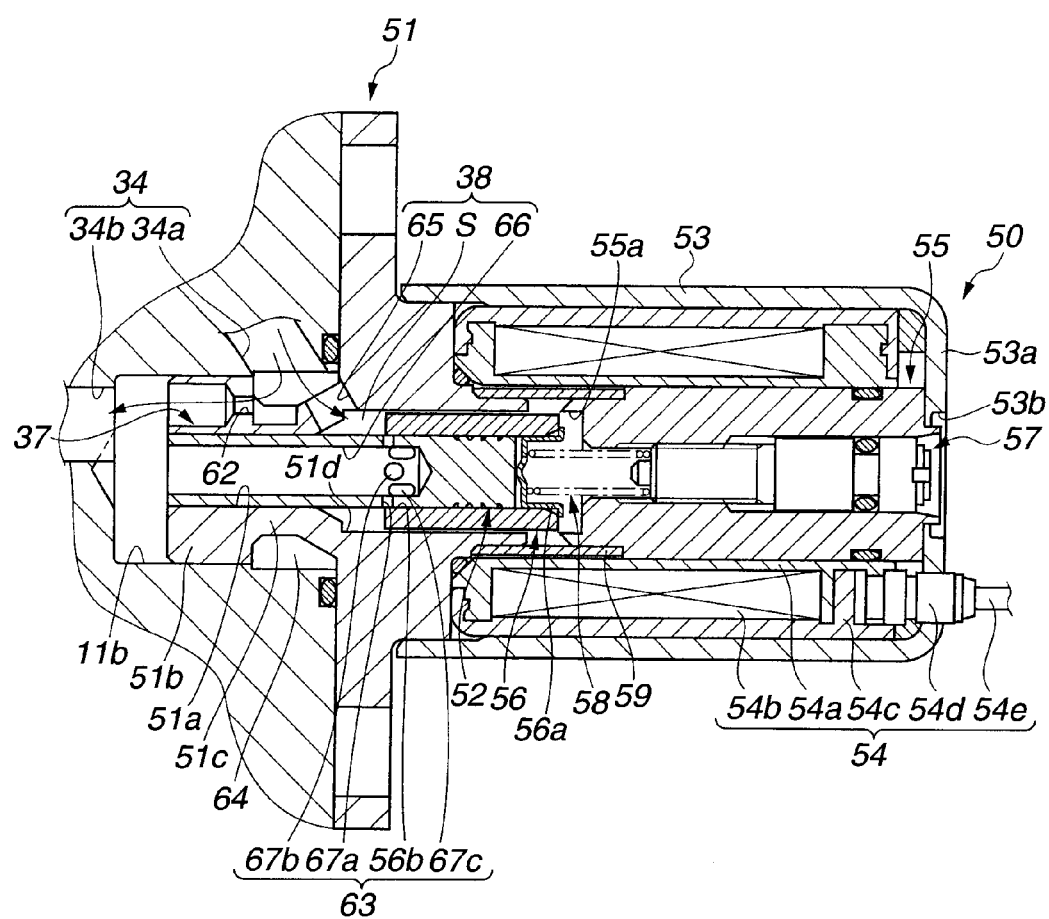
FIG. 6 is a partly enlarged view of FIG. 3, showing an entire construction of an electromagnetic valve that is used in the variable displacement pump of the first embodiment and is in a deenergized state thereof.
Figure 7:
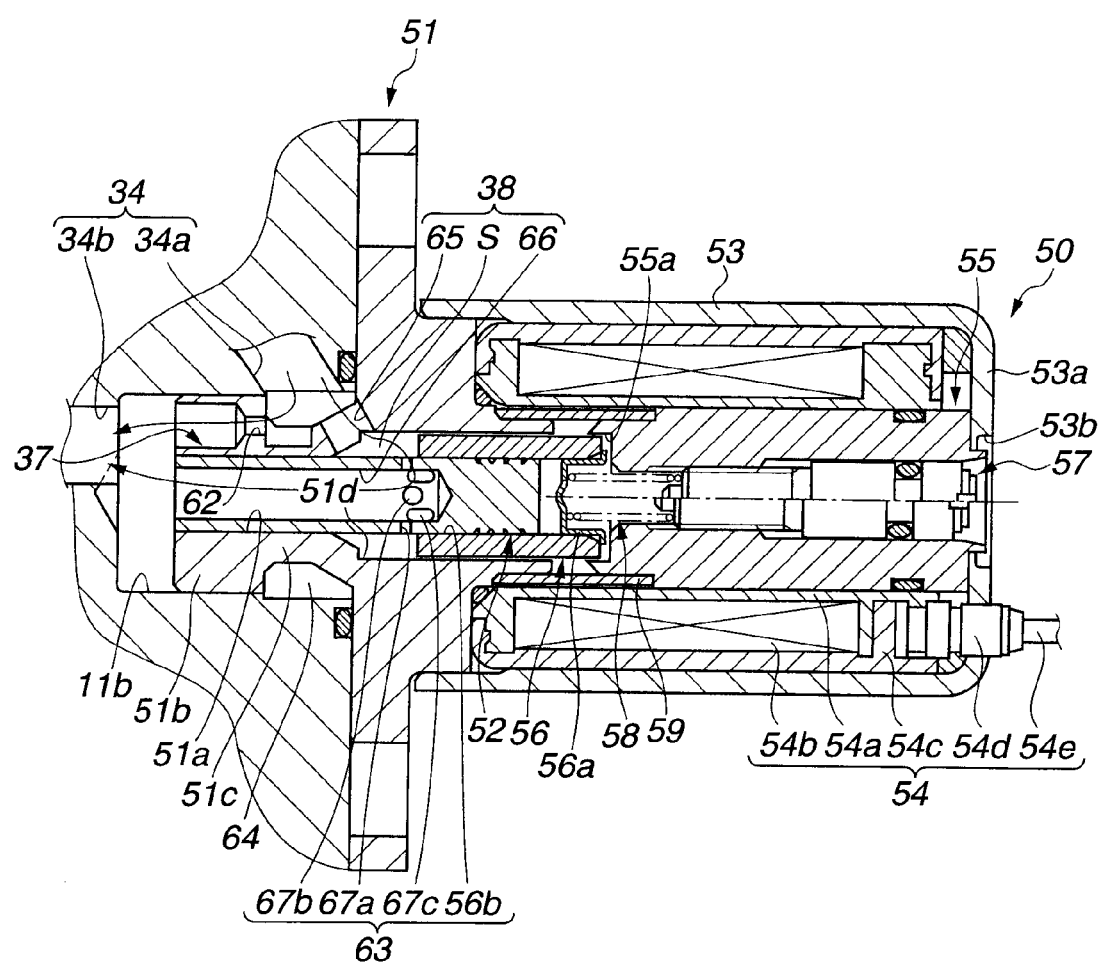
FIG. 7 is a view similar to FIG. 6, but shows the electromagnetic valve that is in an energized state thereof.
Figure 8:
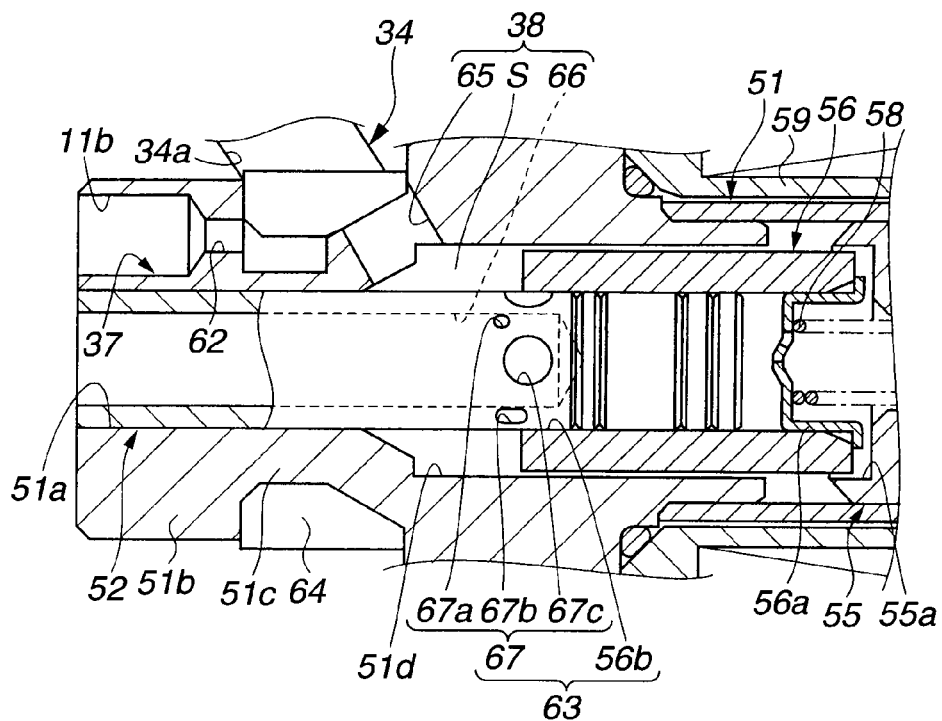
FIG. 8 is an enlarged diagram showing an essential part of FIG. 7.

As shown in FIG. 2 to FIG. 5, electromagnetic valve 50 is disposed at the upper end portion of pump body 11 in substantially parallel to control valve 40. As shown in FIG. 6 to FIG. 8, electromagnetic valve 50 includes generally cylindrical valve housing 51 partly fitted to valve housing accommodating bore 11b of pump body 11 which is opened to a side surface of pump body 11 and connected at a bottom thereof to the terminal end of second connecting passage 34. Electromagnetic valve 50 further includes valve body 52 fixedly disposed within valve body accommodating bore 51a that extends through a radial inside of one axial end portion of valve housing 51, cup-shaped casing 53 that has one end portion fixed to an outer circumferential surface of the other axial end portion of valve housing 51 and an opposite end portion outwardly extending, and generally cylindrical coil unit 54 disposed on a radial inside of casing 53. Generally cylindrical stationary core 55 made of a magnetic material is fixedly disposed on a radial inside of coil unit 54 and connected to an inner cylindrical portion of the other axial end portion of valve housing 51 through magnetic ring 59. Generally cylindrical hollow moveable core 56 serving as an armature is supported on an inner circumferential surface of the other axial end portion of valve housing 51 so as to be slidable relative to valve body 52 and opposed to stationary core 55. Adjustor plug 57 is screwed into a radial inside of stationary core 55 and adjusts a biasing force (i.e., a pre-load) of biasing member 58. Biasing member 58 is interposed between adjustor plug 57 and retainer 56a that is disposed at an axial tip end portion of moveable core 56 which is opposed to stationary core 55. Biasing member 58 biases moveable core 56 in such a direction as to be apart from stationary core 55. In this embodiment, a coil spring is used as biasing member 58.

As shown in FIG. 1, electromagnetic valve 50 is drivingly controlled by a control current output from electronic controller 70 on the basis of results of detection conducted by steering angle sensor 71 and vehicle speed sensor 72 that detects vehicle speed. Specifically, in the power steering apparatus, since a larger steering assist force is required as the steering angle is increased, an amount of electric current to be supplied to electromagnetic valve 50 becomes larger with the increase in the steering angle. In contrast, with respect to a relationship between the vehicle speed and the electric current amount to be supplied to electromagnetic valve 50, a larger steering assist force is required as the vehicle speed is decreased. Therefore, the electric current amount to be supplied to electromagnetic valve 50 is increased with reduction of the vehicle speed.

Valve housing 51 is mounted to pump body 11 through a flanged portion with an increased diameter which is formed at a middle position in the axial direction of valve housing 51. Valve housing 51 is mounted to pump body 11 through the flanged portion. Valve housing 51 has fitting insertion portion 51b on a side of the one axial end portion fitted to valve housing accommodating bore 11b, and annular constriction 51c disposed between the flanged portion and fitting insertion portion 51b. Annular constriction 51c continuously extends from a base portion of fitting insertion portion 51b to the flanged portion in an axial direction of valve housing 51 and has a reduced diameter smaller than the base portion and the flanged portion. Annular passage 64 is formed on an outer circumferential side of constriction 51c, which is defined between an outer circumferential surface of constriction 51c and an inner circumferential surface of valve housing accommodating bore 11b. First oil passage 37 is disposed within fitting insertion portion 51b of valve housing 51. First oil passage 37 extends from constriction 51c through fitting insertion portion 51b and is opened to a tip end surface of fitting insertion portion 51b. First oil passage 37 constitutes a part of second connecting passage 34, through which an upstream side of valve housing accommodating bore 11*b* and a downstream side thereof are always communicated with each other. Second orifice 62 is disposed in first oil passage 37, which serves as a fixed orifice having a non-variable flow passage sectional area. Second orifice 62 is formed by reducing a diameter of first oil passage 37.

Moveable core accommodating portion 51*d* is defined by the inner circumferential surface of the other axial end portion of valve housing 51 and has an increased diameter larger than an inner diameter of fitting insertion portion 51*b*. Moveable core 56 is received in moveable core accommodating portion 51*d* so as to be moveable in the axial direction of valve housing 51. Communicating hole 65 is formed in fitting insertion portion 51*b* and extends through fitting insertion portion 51*b* to communicate annular passage 64 and moveable core accommodating portion 51*d* with each other. Introducing passage 34*a* that constitutes a part of second connecting passage 34 is formed in an inclined state on an upstream side of valve housing accommodating bore 11*b* and communicates pressure chamber 32 and valve housing accommodating bore 11*b* with each other. With this construction, the discharged working oil supplied from pressure chamber 32 into valve housing accommodating bore 11*b* is introduced into moveable core accommodating portion 51*d* via annular passage 64 and communicating hole 65.

Valve body 52 is formed into a cylindrical shape having one open axial end and the other closed axial end. Valve body 52 has axial passage 66 on an inner circumferential side thereof. Axial passage 66 is opened to the one axial end and exposed to discharge passage 34*b* of second connecting passage 34 which is formed on a downstream side of valve housing accommodating bore 11*b*. Also, valve body 52 has a plurality of valve holes 67 which include valve holes 67*a*, 67*b* and 67*c* as shown in FIG. 6 to FIG. 8. Valve holes 67 serve as orifices and are disposed in predetermined axial positions on a side of the other axial end of valve body 52. Valve holes 67 extend through valve body 52 in a radial direction of valve body 52, respectively. The inner circumferential side of valve body 52 and the outer circumferential side thereof are communicated with each other through valve holes 67. The number of valve holes 67 is not particularly limited.

In a case where electromagnetic valve 50 is in the deenergized state, that is, in a case where exciting current is not supplied to coil unit 54, moveable core 56 is placed in a most retreated position thereof within moveable core accommodating portion 51*d* as shown in FIG. 6 and valve holes 67 are closed by valve portion 56*b* that is a rear end portion of moveable core 56. In contrast, in a case where exciting current is supplied to coil unit 54, moveable core 56 is moved to advance toward a side of stationary core 55 by a magnetic force generated in coil unit 54 as shown in FIG. 7 and valve holes 67 are uncovered with valve portion 56*b* and opened. Valve holes 67 are configured to have the above positional relationship with moveable core 56. In FIG. 6 and FIG. 7, arrows drawn as extending through introducing passage 34*a*, first oil passage 37 and communicating hole 65 denote flows of the discharged oil.

In this embodiment as well as the following embodiments, moveable core 56 may be constructed as a united body unlike the conventional electromagnetic valves including two separate parts, i.e., the armature and the valve member. With this construction, it is possible to suppress increase in weight and size of the entire electromagnetic valve which is caused due to the separate parts and enhance response ability of the electromagnetic valve and energy saving thereof. Further, owing to the simple configuration, such as the generally cylindrical shape, of the electromagnetic valve, it is possible to reduce a production cost of the electromagnetic valve.

When respective valve holes 67 are opened according to the axial movement of moveable core 56 as explained above, communicating hole 65, axial passage 66, and annular space S that is defined by valve body 52 and moveable core 56 within moveable core accommodating portion 51*d* are communicated with each other. Communicating hole 65, axial passage 66, and annular space S cooperate with each other to form second oil passage 38 as a continuously extending oil passage. With the construction of second oil passage 38, when respective valve holes 67 are opened, a part of the discharged oil is allowed to flow to discharge passage 34*b* through second oil passage 38.

Respective valve holes 67 are constructed to vary a degree of opening thereof in accordance with an amount of overlapping with valve portion 56*b* of moveable core 56 which is determined on the basis of the position of moveable core 56 relative to valve body 52. That is, respective valve holes 67 are constructed to vary a degree of opening thereof in accordance with the current amount to be supplied to electromagnetic valve 50. Respective valve holes 67 and valve portion 56*b* of moveable core 56 thus constitute third orifice 63 that serves as a variable orifice having a variable flow passage sectional area. Third orifice 63 is disposed within second oil passage 38.

As described above, second orifice 62 and third orifice 63 are provided on second connecting passage 34 between introducing passage 34*a* and discharge passage 34*b*. Second orifice 62 as the fixed orifice and third orifice 63 as the variable orifice constitute metering orifice 60 that variably controls a discharge pressure of the pump.

Specifically, in metering orifice 60, in a case where the exciting current is not supplied to coil unit 54, the attraction force that is applied to moveable core 56 toward the side of stationary core 55 is not generated so that moveable core 56 is held in the most retreated position shown in FIG. 6 by the biasing force of biasing member 58. In the most retreated position, third orifice 63 is in the closed state and pressure chamber 32 is communicated with intermediate pressure chamber 45 through second orifice 62, discharge passage 34*b*, delivery passage 34*c* and communicating throttle 34*d* as shown in FIG. 5. Delivery passage 34*c* extends from discharge passage 34*b* to an outside of electromagnetic valve 50, and communicating throttle 34*d* communicates delivery passage 34*c* with intermediate pressure chamber 45 of control valve 40.

With the above-described construction of metering orifice 60, a flow passage sectional area at metering orifice 60 becomes a minimum and a pressure difference between the upstream side of metering orifice 60 and the downstream side of metering orifice 60, that is, a differential pressure between high pressure chamber 44 and intermediate pressure chamber 45 becomes larger. Therefore, an internal pressure in high pressure chamber 44 of control valve 40 overcomes the spring force of valve spring 43 and pushes valve body 41 toward the side of intermediate pressure chamber 45, so that the pump discharge pressure having a high pressure value is introduced into first fluid pressure chamber 20*a*. As a result, an internal pressure in first fluid pressure chamber 20*a* is increased to thereby swing cam ring 17 in such a direction as to reduce the eccentric amount relative to rotor 21. This results in reduction of the specific discharge amount and therefore reduction of the pump discharge flow rate. When the pump discharge flow rate is reduced, the pressure difference between the upstream side of metering orifice 60 and the downstream side of metering orifice 60 returns to an initial value so that control valve 40 is returned to a pressure regulating position thereof and balanced at the position.

On the other hand, in a case where the exciting current is supplied to coil unit 54, a magnetic field that extends from the side of valve housing 51 toward the side of stationary core 55 is generated to thereby produce the attraction force that is applied to moveable core 56 toward the side of stationary core 55. Moveable core 56 is urged to advance rightward in FIG. 7 against the biasing force of biasing member 58 in accordance with the attraction force, so that third orifice 63 comes into an opened state. As a result, pressure chamber 32 is communicated with discharge passage 34b through second orifice 62 and third orifice 63 and communicated with intermediate pressure chamber 45 through discharge passage 34b, delivery passage 34c and communicating throttle 34d. In this case, the flow passage sectional area of metering orifice 60 is increased by an amount of the opening of third orifice 63.

Since the flow passage sectional area of metering orifice 60 is continuously increased as the current amount that is supplied to coil unit 54 is increased, the pressure difference between the upstream side of metering orifice 60 and the downstream side of metering orifice 60 is gradually decreased with the increase in the current amount that is supplied to coil unit 54. Owing to the decrease in the pressure difference, valve body 41 of control valve 40 is urged toward the side of high pressure chamber 44 by the internal pressure in high pressure chamber 44 and the spring force of valve spring 43 so that the pump suction pressure having a low pressure value is introduced into first fluid pressure chamber 20a. As a result, the internal pressure in first fluid pressure chamber 20a is decreased and overcome by the spring force of coil spring 25, thereby permitting cam ring 17 to swing in such a direction as to increase the eccentric amount relative to rotor 21 against the spring force of coil spring 25. This results in increase in the specific discharge amount and therefore increase in the pump discharge flow rate. Thus, oil pump 10 can control the eccentric amount of cam ring 17 relative to rotor 21 by drivingly controlling electromagnetic valve 50 and thereby attain an optional discharge flow rate.

Casing 53 of electromagnetic valve 50 has one open end portion that is fitted onto an outer surface of the other axial end portion of valve housing 51 and is fixed thereto by a suitable fastening means such as caulking. Casing 53 has the other end portion with bottom wall 53a and through-hole 53b that extends through a central portion of bottom wall 53a. Through-hole 53b is configured to have a diameter slightly larger than an inner diameter of stationary core 55 for rotating adjustor plug 57 by a predetermined tool that is inserted from an outside of through-hole 53b thereinto.

Coil unit 54 is formed into a generally cylindrical shape having flanges on both axial end portions. Coil unit 54 includes bobbin 54a fitted onto an outer circumferential side of opposed end portions of both cores 55, 56, coil 54b wound on an outer circumferential surface of bobbin 54a, and generally cylindrical yoke 54c surrounding an outer circumferential side of bobbin 54a. Harness 54e that is derived from electronic controller 70 is connected to coil 54b through grommet 54d that is fitted to bottom wall 53a of casing 53.

Stationary core 55 has engaging portion 55a on an axial end surface thereof that is opposed to the tip end portion of moveable core 56. Engaging portion 55a is in the form of a recess in which the tip end portion of moveable core 56 is engaged when moveable core 56 is attracted to stationary core 55 by the electromagnetic attraction force that is generated upon energization of coil 54b. Engaging portion 55a is configured to correspond to a shape of the tip end portion of moveable core 56. Engaging portion 55a has an inside bottom surface that is in contact with an axial end surface of the tip end portion of moveable core 56 upon engagement with the tip end portion of moveable core 56 being established. In other words, in this embodiment, moveable core 56 having a flat magnetic pole is attracted by stationary core 55 having the corresponding flat magnetic pole.

Figure 19:
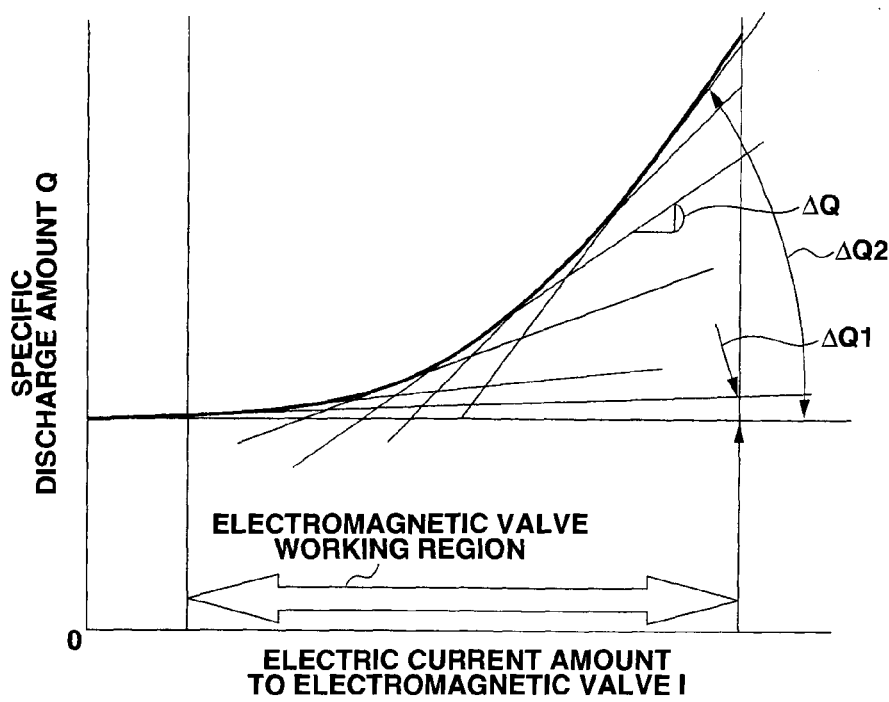
FIG. 19 is a graph showing a relationship between amount of electric current to be supplied to the electromagnetic valve and specific discharge amount of the variable displacement pump in the first embodiment.
Figure 20:
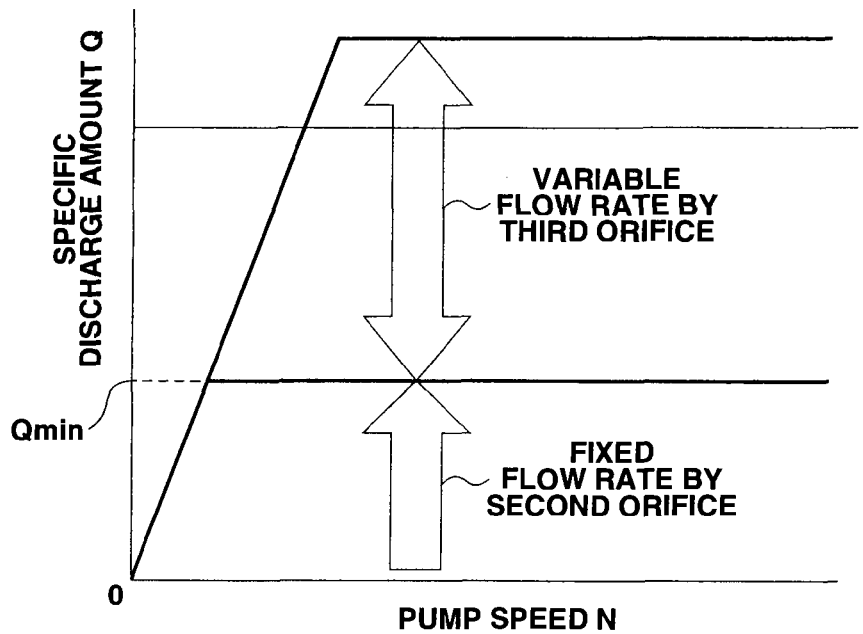
FIG. 20 is a graph showing a relationship between pump rotation number (i.e., pump speed) and specific discharge amount of the variable displacement pump in the first embodiment.

Electromagnetic valve 50 having the above-described construction has such a characteristic that a rate of change in the specific discharge amount relative to an electric current amount to be supplied to electromagnetic valve 50 has a so-called nonlinear characteristic as indicated by a thick solid line in FIG. 19. Specifically, as shown in the nonlinear characteristic curve of FIG. 19, the rate of change in the specific discharge amount is reduced under a condition that the electric current amount to be supplied to electromagnetic valve 50 is smaller, and the rate of change in the specific discharge amount is increased under a condition that the electric current amount to be supplied to electromagnetic valve 50 is larger. In this embodiment, the nonlinear characteristic is attained by the specific arrangement of respective valve holes 67 in valve body 52.

Figure 9:
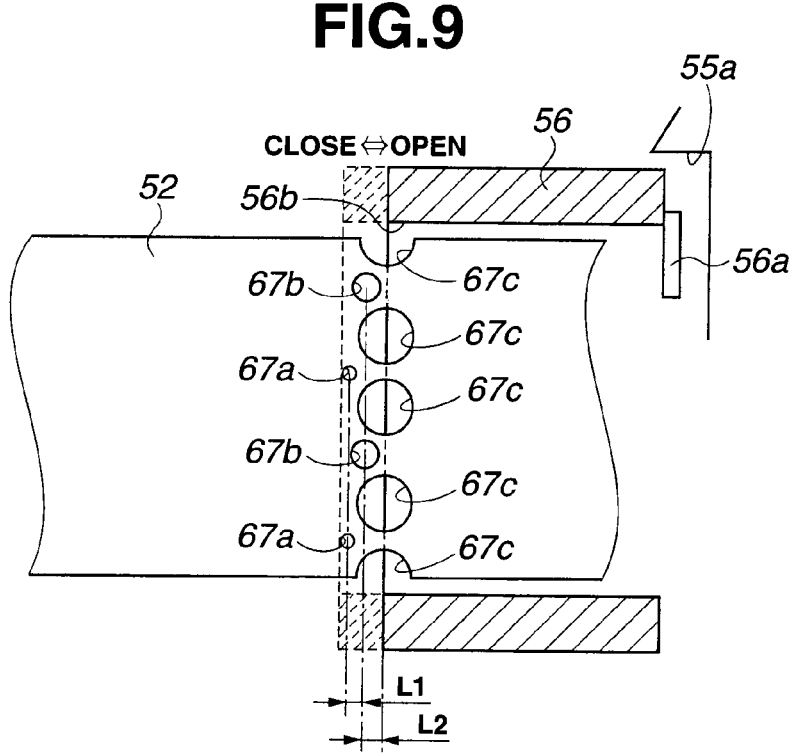
FIG. 9 is a schematic diagram showing arrangement and open/closed state of valve holes of the electromagnetic valve that is used in the variable displacement pump of the first embodiment.

More specifically, in this embodiment, valve holes 67 include three kinds of valve holes 67a, 67b, 67c which are different in diameters from each other as shown in FIG. 8 and FIG. 9. Valve holes 67a, 67b, 67c are hereinafter referred to as small diameter valve hole 67a, intermediate diameter valve hole 67b and large diameter valve hole 67c, respectively.

As best shown in FIG. 9, a plurality of small diameter valve holes 67a which are identical in diameter to each other are arranged in positions aligned in the axial direction of valve body 52 and spaced from each other at predetermined equivalent intervals in the circumferential direction of valve body 52. A plurality of intermediate diameter valve holes 67b and a plurality of large diameter valve holes 67c are respectively arranged in the same manner as the arrangement of small diameter valve holes 67a. Further, small diameter valve holes 67a, intermediate diameter valve holes 67b and large diameter valve holes 67c which are different in diameter from each other are arranged to be offset from each other both in the circumferential direction of valve body 52 and along a direction of the axial displacement of moveable core 56 toward the side of the one axial end of valve body 52 in the order of increase in size of the diameter.

Specifically, as shown in FIG. 9, small diameter valve holes 67a are formed in a predetermined axial position in the axial direction of valve body 52 and at the equivalent interval therebetween along the circumferential direction of valve body 52. Intermediate diameter valve holes 67b are formed in an offset position which is offset from the predetermined axial position of small diameter valve holes 67a by predetermined distance L1 in the axial direction of valve body 52, at the equivalent interval therebetween along the circumferential direction of valve body 52. Large diameter valve holes 67c are formed in an offset position which is offset from the offset position of intermediate diameter valve holes 67b by predetermined distance L2 in the axial direction of valve body 52, and at the equivalent interval therebetween along the circumferential direction of valve body 52. In other words, small diameter valve holes 67a, intermediate diameter valve holes 67b and large diameter valve holes 67c are arranged to be opened in the order of from smaller to larger size of the diameter when moveable core 56 is displaced toward the side of stationary core 55. That is, when moveable core 56 is displaced toward the side of stationary core 55, small diameter valve holes 67a are first opened, then intermediate diameter valve holes 67b are opened, and large diameter valve holes 67c are lastly opened.

With the arrangement of small diameter valve holes 67a, intermediate diameter valve holes 67b and large diameter valve holes 67c, as moveable core 56 is axially displaced from the side of small diameter valve holes 67a toward the side of large diameter valve holes 67c, the flow passage sectional area is enlarged to thereby increase the specific discharge amount. Conversely, as moveable core 56 is axially displaced from the side of large diameter valve holes 67c toward the side of small diameter valve holes 67a, the flow passage sectional area is decreased to thereby reduce the specific discharge amount.

An operation of controlling the electric current amount to be supplied to electromagnetic valve 50 which is carried out by electronic controller 70 will be explained hereinafter by reference to flowcharts shown in FIG. 10 to FIG. 12.

Figure 10:
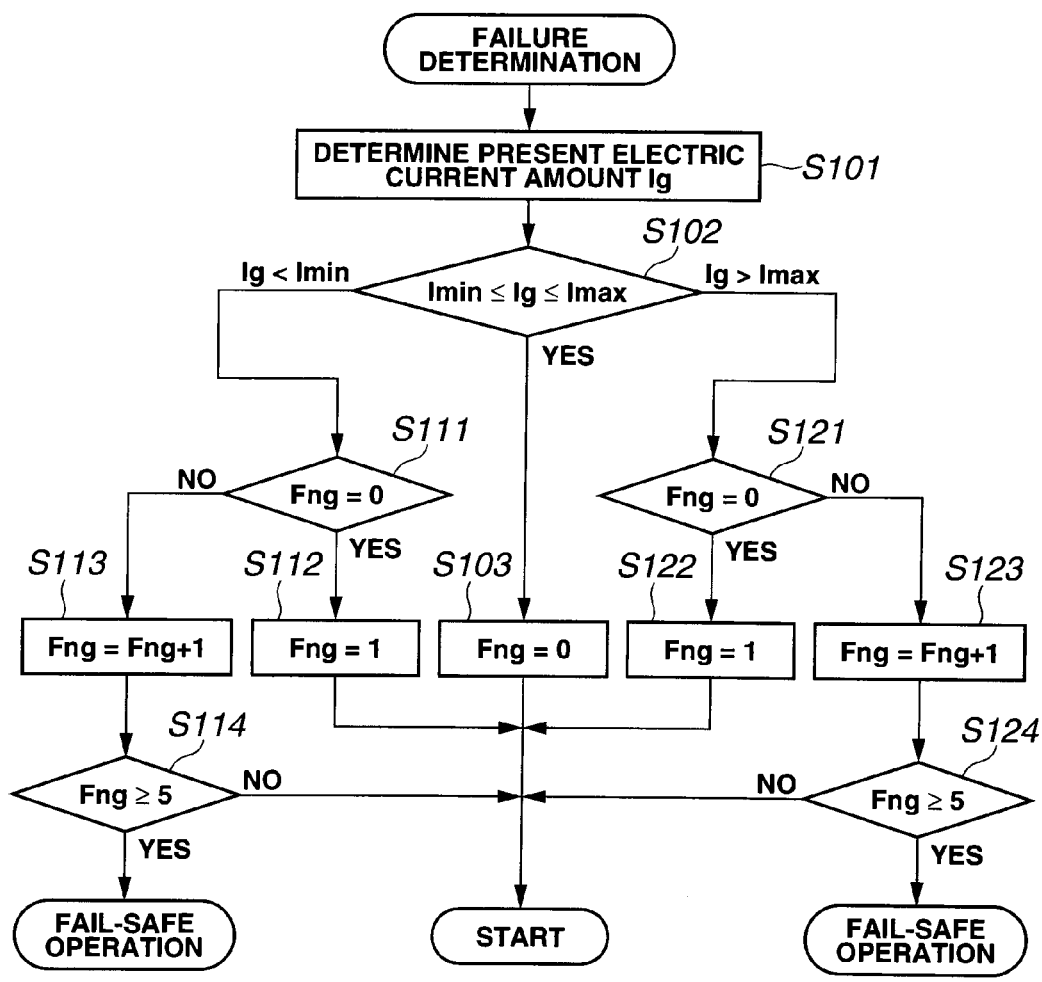
FIG. 10 is a flowchart showing an operation of determining a failure at the electromagnetic valve.

Upon conducing control of the electric current amount to be supplied to electromagnetic valve 50, first, determination of failure of electromagnetic valve 50 is made in accordance with the flowchart shown in FIG. 10.

As shown in FIG. 10, a logic flow of the determination of failure of electromagnetic valve 50 goes to step S101 where electric current amount Ig that is at present supplied to electromagnetic valve 50 is determined. In step S102, a determination is made as to whether or not electric current amount Ig is within a predetermined range from Imin to Imax which is a range of an appropriate value of electric current amount Ig.

In a case where in step S102, it is determined that electric current amount Ig is within the predetermined range from Imin to Imax, the logic flow proceeds to step S103 in which a frequency of re-determination operation Fng is set to 0. Then, the logic flow proceeds to the control of the electric current amount to be supplied to electromagnetic valve 50.

On the other hand, in a case where in step S102, it is determined that electric current amount Ig is not within the predetermined range of from Imin to Imax and electric current amount Ig is less than Imin that is an appropriate minimum value of electric current amount Ig, the logic flow proceeds to step S111. In step S111, a determination is made as to whether or not the frequency of re-determination operation Fng is 0 in order to determine whether a fail-safe operation as explained later is not necessary because electric current amount Ig less than Imin is caused due to a temporary interference such as noise, or the fail-safe operation is necessary because electric current amount Ig less than Imin is caused due to an absolute failure such as break in coil 54b.

In the determination operation in step S111, in a case where it is determined that the frequency of re-determination operation Fng is 0, the logic flow proceeds to step S112 in which the frequency of the re-determination operation Fng is set to 1. Then, the logic flow proceeds to the control of the electric current amount to be supplied to electromagnetic valve 50. On the other hand, in a case where in step S111, it is determined that the frequency of re-determination operation Fng is not 0, the logic flow proceeds to step S113 in which the frequency of the re-determination operation Fng is updated. Then, the logic flow proceeds to step S114 in which a determination as to whether or not the frequency of the re-determination operation Fng has reached an optional value (5 in this embodiment) is made. In a case where in step S114, it is determined that the frequency of the re-determination operation Fng has reached the optional value, the logic flow proceeds to the fail-safe operation.

In a case where in step S102, it is determined that electric current amount Ig is not within the predetermined range from Imin to Imax and electric current amount Ig is more than Imax that is an appropriate maximum value of electric current amount Ig, the logic flow proceeds to step S121. In step S121, a determination is made as to whether or not the frequency of re-determination operation Fng is 0 in order to determine whether the fail-safe operation is not necessary because electric current amount Ig more than Imax is caused due to a temporary interference such as noise, or the fail-safe operation is necessary because electric current amount Ig more than Imax is caused due to an absolute failure such as overcurrent.

The determination operation in step S121 is conducted similar to the determination operation in step S111 which is conducted under a condition that electric current amount Ig is less than Imin. In the determination operation in step S121, in a case where it is determined that the frequency of re-determination operation Fng is 0, the logic flow proceeds to step S122 in which the frequency of the re-determination operation Fng is set to 1. Then, the logic flow proceeds to the control of the electric current amount to be supplied to electromagnetic valve 50. On the other hand, in a case where in step S121, it is determined that the frequency of re-determination operation Fng is not 0, the logic flow proceeds to step S123 in which the frequency of the re-determination operation is updated. Then, the logic flow proceeds to step S124 in which a determination as to whether or not the frequency of the re-determination operation has reached the optional value (5 in this embodiment) is made. In a case where in step S124, it is determined that the frequency of the re-determination operation has reached the optional value, the logic flow proceeds to the fail-safe operation.

Subsequent to the operation of determining failure of electromagnetic valve 50 as described above, the control of the electric current amount to be supplied to electromagnetic valve 50 (hereinafter referred to as the electric current amount to electromagnetic valve 50) is conducted in accordance with the flowchart shown in FIG. 11.

As shown in FIG. 11, a logic flow of the control of the electric current amount to electromagnetic valve 50 starts and goes to step S201 where vehicle speed V is detected by vehicle speed sensor 72. Since vehicle speed V has a close relation to a so-called steering assist force and the steering assist force is determined on the basis of the specific discharge amount of the pump, the discharge flow rate of the pump can be more appropriately controlled by controlling electromagnetic valve 50 on the basis of vehicle speed V.

Subsequently, in step S202, steering angle θ (i.e., steering amount) is detected by steering angle sensor 71, and then in step S203, steering angular speed vθ (i.e., |θ/s|) that is steering angle θ per unit time s is calculated on the basis of steering angle θ detected in step S202. Since steering angular speed vθ also has a close relation to the steering assist force, and therefore, to the specific discharge amount of the pump, the discharge flow rate of the pump can also be more appropriately controlled by controlling electromagnetic valve 50 on the basis of steering angular speed vθ as explained later.

Figure 13:
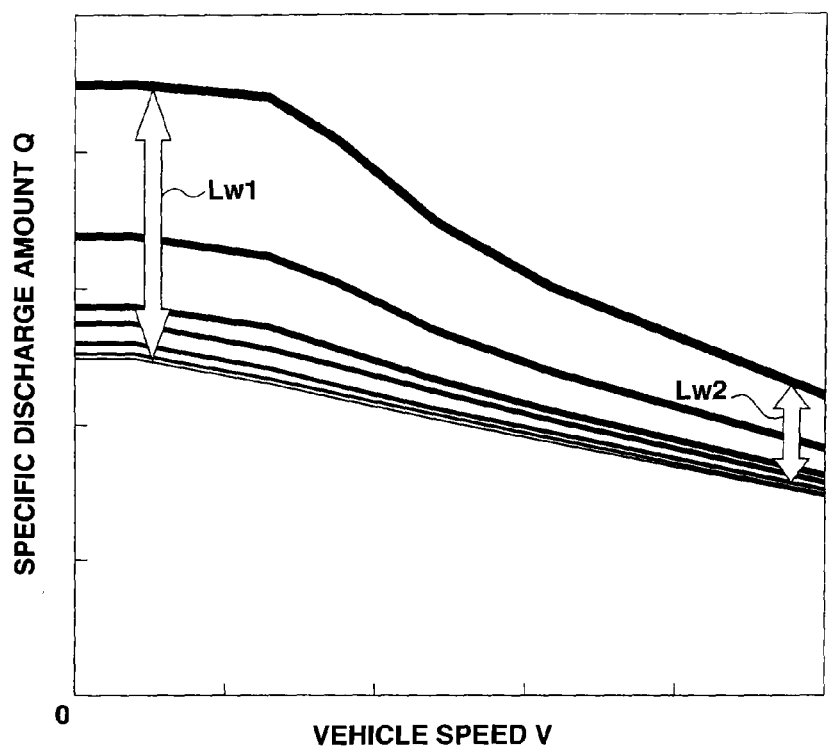
FIG. 13 is a discharge flow rate control map relating to basic control of a discharge flow rate of the variable displacement pump of the first embodiment, showing a relationship between vehicle speed and specific discharge amount.
Figure 14:
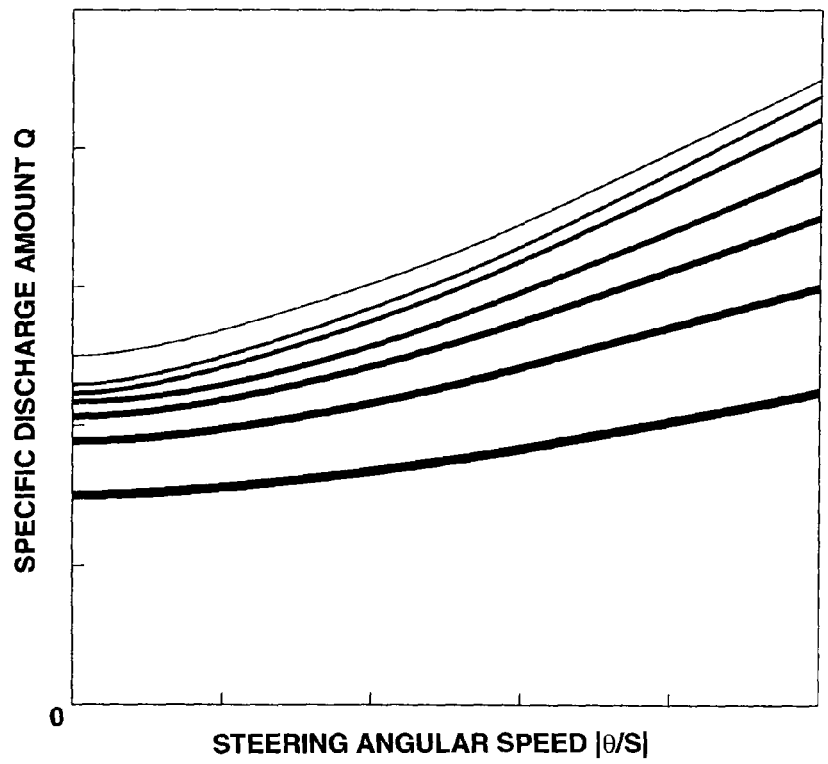
FIG. 14 is a discharge flow rate control map relating to basic control of a discharge flow rate of the variable displacement pump of the first embodiment, showing a relationship between steering angular speed and specific discharge amount.

In step S204, necessary specific discharge amount Q of oil pump 10 is retrieved from a discharge flow rate control map shown in FIG. 13 which is based on a relationship between vehicle speed V and specific discharge amount Q, or a discharge flow rate control map shown in FIG. 14 which is based on a relationship between steering angular speed vθ and specific discharge amount Q.

Subsequent to retrieving specific discharge amount Q of oil pump 10 from the discharge flow rate control map shown in FIG. 13 or the discharge flow rate control map shown in FIG. 14, the logic flow proceeds to step S205 where provisional target electric current value Im is retrieved from a provisional target electric current amount map shown in FIG. 19 on the basis of specific discharge amount Q retrieved in step S204.

Next, in step S206, a determination as to whether or not provisional target electric current value Im retrieved from the provisional target electric current amount map is within the predetermined range of from Imin to Imax is made.

In a case where it is determined that provisional target electric current value Im is within the predetermined range of from Imin to Imax, the logic flow proceeds to step S207 where target electric current value Io is set to provisional target electric current value Im.

On the other hand, in a case where it is determined that provisional target electric current value Im is not within the predetermined range of from Imin to Imax and provisional target electric current value Im is less than appropriate minimum value Imin, the logic flow proceeds to step S217 where target electric current value Io is set to Imin. In a case where it is determined that provisional target electric current value Im is not within the predetermined range from Imin to Imax and provisional target electric current value Im is more than appropriate maximum value Imax, the logic flow proceeds to step S227 where target electric current value Io is set to Imax.

Next, in step S208, target electric current value Io set to the respective values in steps S207, S217, S227 is output to electromagnetic valve 50. Subsequently, in a case where in the failure determination operation for electromagnetic valve 50, it is determined that the fail-safe operation must be conducted, the fail-safe operation is conducted in accordance with the flowchart shown in FIG. 12. In a case where in the failure determination operation for electromagnetic valve 50, it is determined that the fail-safe operation is not necessary, the control of the electric current amount to electromagnetic valve 50 is ended.

The fail-safe operation is explained as follows. As shown in FIG. 12, in step S301, target electric current value Io is set to 0 and supply of electric current to electromagnetic valve 50 is interrupted. In step S302, a signal for turning on a warning lamp is output.

As described above, in a case where a failure of electromagnetic valve 50 is determined, the discharge flow rate control using electromagnetic valve 50 is stopped by interrupting supply of the electric current to electromagnetic valve 50 in the fail-safe operation. As a result, it is possible to prevent damage to safety of the steering operation due to abnormal discharge flow rate control and thereby serve for enhancing the safety of the steering operation.

Next, a basic control of the discharge flow rate of oil pump 10 will be explained by referring to the discharge flow rate maps respectively shown in FIG. 13 and FIG. 14.

In the above-described power steering apparatus, upon low speed running of the vehicle, for instance, in a case where the vehicle is turned to the right or the left, the above-described power steering apparatus needs to produce a relatively large steered road wheel amount and a large steering assist force corresponding to the relatively large steered road wheel amount. Therefore, under such a low speed running condition, the power steering apparatus necessitates a large discharge flow rate (specific discharge amount Q) of oil pump 10.

In contrast, upon high speed running of the vehicle, the frequency of occurrence of a case where a larger steered road wheel amount is necessary is less than upon the low speed running of the vehicle, and steering angular speed vθ as steered road wheel speed is smaller than upon the low speed running of the vehicle. Therefore, upon high speed running of the vehicle, the power steering apparatus does not need to produce a steering assist force as large as upon the low speed running of the vehicle. Accordingly, under the high speed running condition, the power steering apparatus necessitates a smaller discharge flow rate (specific discharge amount Q) of oil pump 10 than upon the low speed running of the vehicle.

Further, upon an extremely low speed running of the vehicle, for instance, upon parking the vehicle, a steering amount larger than upon the low speed running of the vehicle is necessary, and steering angular speed vθ is higher than upon the low speed running of the vehicle. Therefore, the power steering apparatus needs to produce a steering assist force larger than upon the low speed running of the vehicle. Accordingly, under such an extremely low speed running condition, the power steering apparatus necessitates a discharge flow rate (specific discharge amount Q) of oil pump 10 which is larger than upon the low speed running of the vehicle.

Thus, specific discharge amount Q of oil pump 10 is controlled so as to decrease with an increase in vehicle speed V as indicated in the discharge flow rate control map shown in FIG. 13. In FIG. 13, as solid lines are thickened, steering angular speed vθ is increased. As illustrated in FIG. 13, in the state where steering angular speed vθ is high, the power steering apparatus necessitates a larger discharge flow rate (specific discharge amount Q) of oil pump 10. Therefore, discharge flow rate (specific discharge amount Q) of oil pump 10 is controlled so as to increase as steering angular speed vθ is increased.

In addition, as vehicle speed V is decreased, steering angle θ becomes larger. Accordingly, a discharge flow rate (specific discharge amount Q) of oil pump 10 which is required in the power steering apparatus becomes larger. For this reason, rate of change Lw1 in specific discharge amount Q which is to be provided in a low vehicle speed region as shown on the left side of FIG. 13 becomes larger than rate of change Lw2 in specific discharge amount Q which is to be provided in a high vehicle speed region as shown on the right side of FIG. 13.

On the other hand, the discharge flow rate control map shown in FIG. 14 is made on the basis of steering angular speed vθ and indicates that specific discharge amount Q is controlled so as to increase as steering angular speed vθ is increased as described above. In FIG. 14, as solid lines are thickened, vehicle speed V becomes higher. As illustrated in FIG. 14, specific discharge amount Q of oil pump 10 is controlled so as to decrease as vehicle speed V is increased.

Next, referring to FIG. 15 to FIG. 19, a change in specific discharge amount Q of oil pump 10 which is caused on the basis of the above-described arrangement of valve holes 67 is explained. A specific function of oil pump 10 according to this embodiment in which specific discharge amount Q is controlled through electromagnetic valve 50 resides in the change in specific discharge amount Q based on the above-described arrangement of valve holes 67. Electromagnetic valve stroke amount L indicated in FIG. 15 to FIG. 19 means an amount of distance between stationary core 55 and moveable core 56 assuming that the amount of distance therebetween is 0 in a case where moveable core 56 is in contact with stationary core 55.

Figure 15:
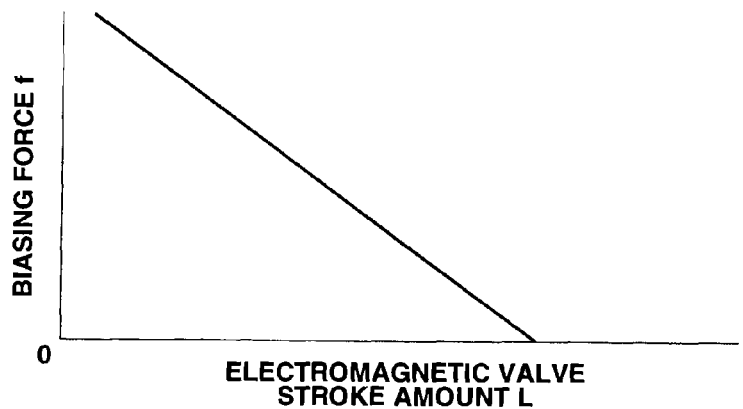
FIG. 15 is a graph showing a relationship between stroke amount of the electromagnetic valve and biasing force of a biasing member of the electromagnetic valve in the first embodiment.

First, FIG. 15 shows a relationship between electromagnetic valve stroke amount L and biasing force f of biasing member 58. Since in this embodiment, a so-called coil spring is used as biasing member 58 that acts against attraction force F (hereinafter referred to as electromagnetic valve attraction force F) which is generated upon energizing electromagnetic valve 50 as shown in FIG. 15, biasing force f of biasing member 58 is linearly increased with reduction of electromagnetic valve stroke amount L.

Figure 16:
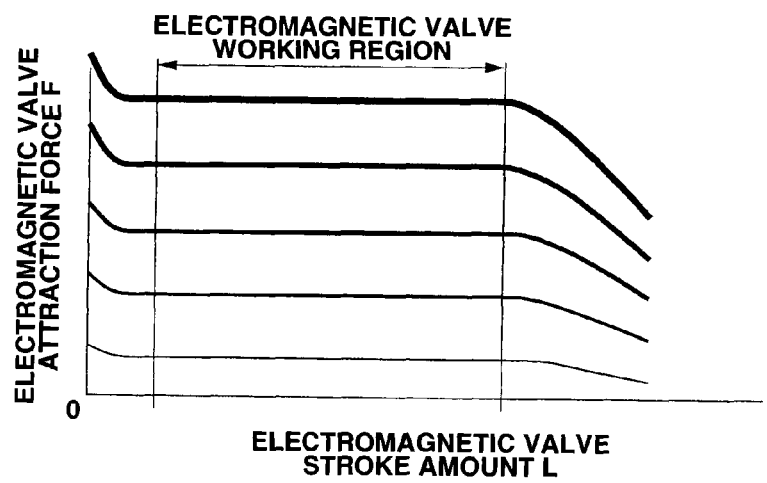
FIG. 16 is a graph showing a relationship between stroke amount of the electromagnetic valve and attraction force of the electromagnetic valve in the first embodiment.

FIG. 16 shows a relationship between electromagnetic valve stroke amount L and electromagnetic valve attraction force F. Since in this embodiment, moveable core 56 is attracted to stationary core 55 through the flat magnetic poles thereof, electromagnetic valve attraction force F varies in accordance with electric current amount I that is supplied to electromagnetic valve 50 (hereinafter referred to as electromagnetic valve current amount I), but electromagnetic valve attraction force F is held constant with respect to electromagnetic valve stroke amount L in a working region of electromagnetic valve 50. In FIG. 16, as solid lines are thickened, electromagnetic valve current amount I is increased.

Figure 17:
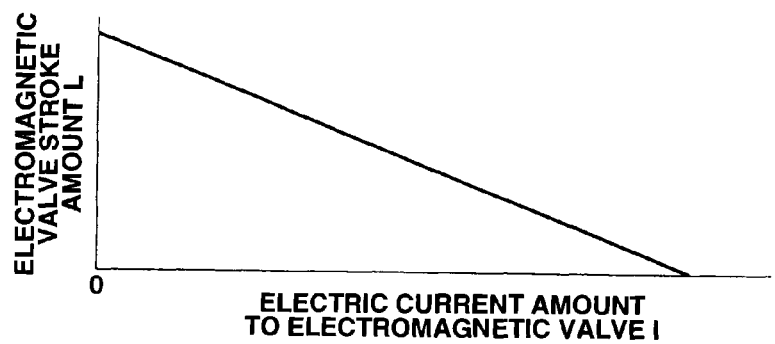
FIG. 17 is a graph showing a relationship between amount of electric current to be supplied to the electromagnetic valve and stroke amount of the electromagnetic valve in the first embodiment.

FIG. 17 shows a relationship between electromagnetic valve current amount I and electromagnetic valve stroke amount L. Owing to the above-described relationship between biasing force f of biasing member 58 and electromagnetic valve attraction force F, electromagnetic valve stroke amount L is linearly reduced with an increase in electromagnetic valve current amount I.

Figure 18:
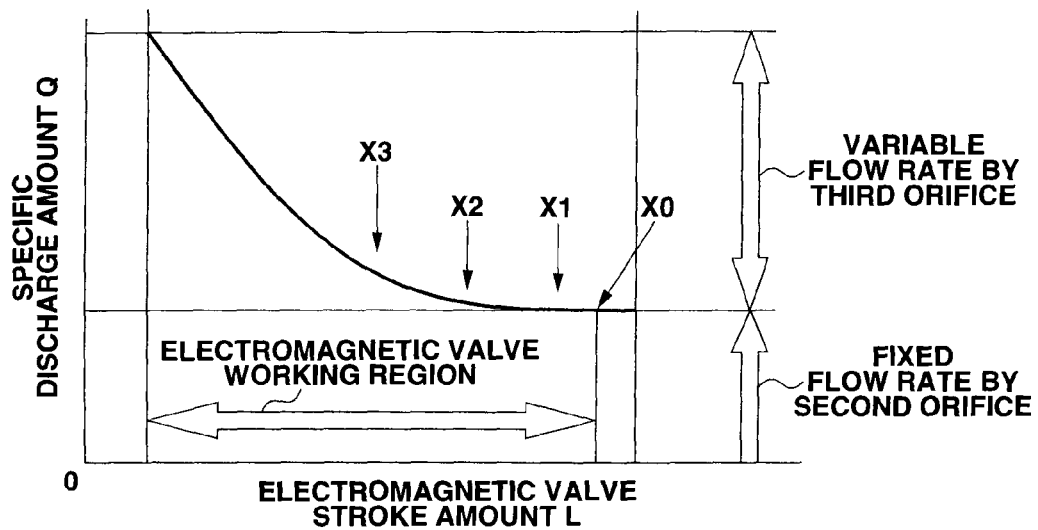
FIG. 18 is a graph showing a relationship between stroke amount of the electromagnetic valve and specific discharge amount of the variable displacement pump in the first embodiment.

In a case where electromagnetic valve 50 is supplied with exciting current, moveable core 56 is moved from most retreating position X0 toward a side of stationary core 55 at a constant rate shown in FIG. 17 with an increase in electromagnetic valve current amount I so that electromagnetic valve stroke amount L is gradually decreased as shown in FIG. 18. When moveable core 56 is moved to axial position X1 shown in FIG. 18, respective small diameter valve holes 67a become opened. Since these small diameter valve holes 67a have the extremely small diameter, the discharge oil amount that passes through third orifice 63 constituted of respective small diameter valve holes 67a and an axial end portion of moveable core 56 is considerably small. Accordingly, specific discharge amount Q of oil pump 10 is hardly increased so that a rate of change in specific discharge amount Q is kept extremely small.

Further, when moveable core 56 is moved from axial position X1 to axial position X2, respective intermediate diameter valve holes 67b become opened. In this state, the discharge oil amount that passes through third orifice 63 is increased by an amount corresponding to a sum of opening areas of respective intermediate diameter valve holes 67b. As a result, specific discharge amount Q of oil pump 10 is slightly increased as compared to that in the case where only small diameter valve holes 67a are in the opened state. Also, a rate of change in specific discharge amount Q becomes slightly larger than that in the case where only small diameter valve holes 67a are in the opened state.

Further, when moveable core 56 is moved from axial position X2 to axial position X3, respective large diameter valve holes 67c become opened. In this state, the discharge oil amount that passes through third orifice 63 is further increased by an amount corresponding to a sum of opening areas of respective large diameter valve holes 67c. As a result, specific discharge amount Q of oil pump 10 is remarkably increased as compared to that in the case where only small diameter valve holes 67a and both of small diameter valve holes 67a and intermediate valve holes 67b are in the opened state, respectively. A rate of change in specific discharge amount Q is markedly increased as compared to that in the case where only small diameter valve holes 67a and both of small diameter valve holes 67a and intermediate valve holes 67b are in the opened state, respectively.

As explained above, electromagnetic valve 50 is constructed such that respective valve holes 67a, 67b and 67c having the diameters different from each other are sequentially opened according to the axial displacement of moveable core 56. With this construction, as seen from FIG. 18, variation in flow passage sectional area of third orifice 63 has a nonlinear characteristic with respect to reduction of a stroke amount of moveable core 56, i.e., reduction of electromagnetic valve stroke amount L, in spite of a linear characteristic of variation in amount of the axial displacement of moveable core 56. For this reason, specific discharge amount Q of oil pump 10 is increased nonlinearly in the form of a generally quadratic curve as indicated in thick solid line in FIG. 19. As a result, a rate of change in specific discharge amount Q (i.e., gradient ΔQ of tangent line to the thick solid line curve as shown in FIG. 19) relative to electromagnetic valve current amount I under a condition that specific discharge amount is smaller as indicated by gradient ΔQ1 is reduced as compared to a rate of change in specific discharge amount Q relative to electromagnetic valve current amount I under a condition that specific discharge amount Q is larger as indicated by gradient ΔQ2.

Further, the electric current amount to be supplied to electromagnetic valve 50 becomes larger with an increase in steering angle. Therefore, a rate of change in specific discharge amount Q relative to steering angle θ (i.e., steering amount) under a condition that specific discharge amount Q is smaller is reduced as compared to a rate of change in specific discharge amount Q relative to steering angle θ under a condition that specific discharge amount Q is larger.

Here, the condition that specific discharge amount Q is small is a straight running condition or a less steering condition in which a steering angle (a steered road wheel amount) is small and a steering angular speed vθ is low. Such a condition occurs with large frequency during the vehicle driving and lies in a so-called working region of oil pump 10. Further, in a case where the rate of change in specific discharge amount Q is small, specific discharge amount Q is hardly changed and is kept small so that a pressure loss in metering orifice 60 can be reduced to a minimum and occurrence of a significant change in steering assist force can be suppressed.

Accordingly, in oil pump 10 of this embodiment, owing to the above-described specific and simple mechanical construction of electromagnetic valve 50, a rate of change in specific discharge amount Q can be reduced without conducting complicated control of electromagnetic valve 50 under a condition that specific discharge amount Q is smaller, that is, in the working region of oil pump 10. This results in both promoting energy conservation and enhancing steering stability.

Further, the power steering apparatus of this embodiment is constructed such that specific discharge amount Q is controlled to be smaller under a condition that vehicle speed V is high, that is, under high speed running condition as shown in FIG. 13. Therefore, it is possible to moderate a change in specific discharge amount Q under the high speed running condition, resulting in enhancing steering stability under the high speed running condition.

Further, in particular, the power steering apparatus of this embodiment is constructed such that specific discharge amount Q is controlled to be smaller under a condition that steering angular speed vθ is low, in other words, under a condition that steering angle θ is small. Therefore, it is possible to moderate a change in specific discharge amount Q under the condition that steering angle θ is small, resulting in enhancing steering stability under a so-called small steering condition where steering angle θ is small.

Further, third orifice 63 is constructed such that the flow passage sectional area is increased with an axial movement of moveable core 56 from a side of small valve holes 67a toward a side of large valve holes 67c. In other words, third orifice 63 is configured such that the flow passage sectional area is decreased with an axial movement of moveable core 56 from the side of large valve holes 67c toward the side of small valve holes 67a. With the construction of third orifice 63, specific discharge amount Q can be controlled by small valve holes 67a under a condition that specific discharge amount Q is small. As a result, a change in discharge flow rate under the small specific discharge amount condition can be more moderated, serving for further enhancing steering stability under the above-described high speed running condition or small steering condition.

Further, oil pump 10 of this embodiment is constructed such that a rate of change in specific discharge amount Q becomes smaller under a condition that electromagnetic valve current amount I is smaller. With this construction of oil pump 10, in a case where the electric current to be supplied to electromagnetic valve 50 is interrupted, variation (i.e., gap) in specific discharge amount Q which occurs immediately before and immediately after the interruption can be reduced. As a result, it is possible to prevent the vehicle driver from having an uncomfortable feeling upon interrupting the electric current to electromagnetic valve 50.

Further, in electromagnetic valve 50 of this embodiment, metering orifice 60 is constituted of second orifice 62 as the fixed orifice and third orifice 63 as the variable orifice. With this construction of metering orifice 60, even in a case where abnormal condition such as failure and malfunction occurs in electromagnetic valve 50, minimum value Qmin of specific discharge amount Q necessary for steering assist can be ensured by second orifice 62 as indicated in solid line in FIG. 20. This results in enhancing steering stability.

Figure 21:
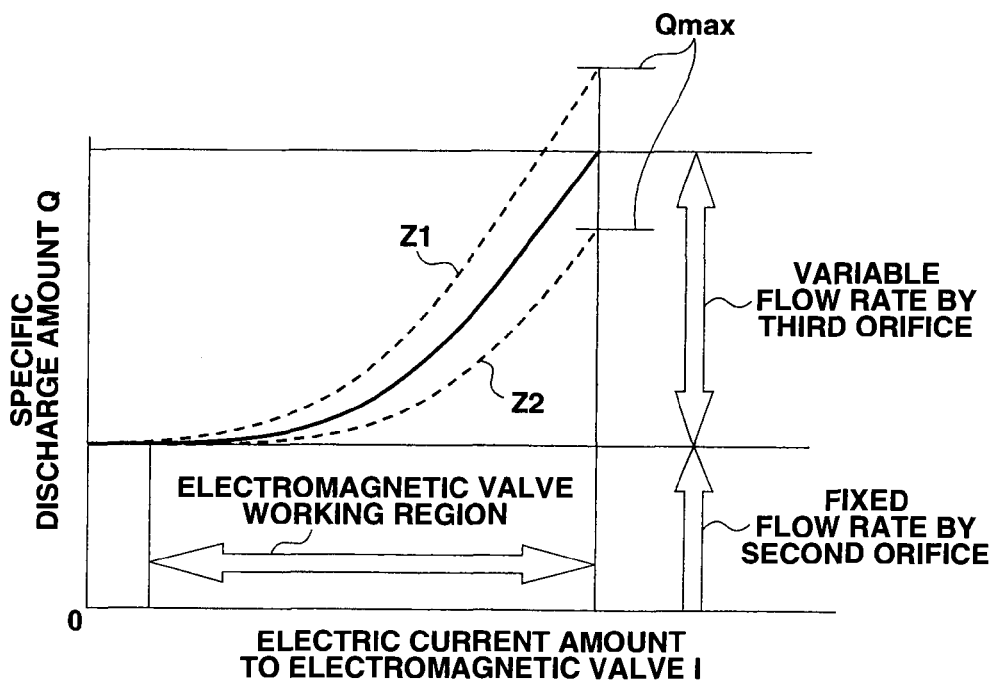
FIG. 21 is a graph showing a relationship between amount of electric current to be supplied to the electromagnetic valve and specific discharge amount of the variable displacement pump in a case where the biasing force of the biasing member as shown in FIG. 19 is adjusted.

Furthermore, oil pump 10 of this embodiment can control maximum value Qmax of specific discharge amount Q, specifically, a variation in specific discharge amount Q as indicated in broken line in FIG. 21 by controlling biasing force f of biasing member 58, while maintaining such a characteristic of electromagnetic valve 50 that variation in specific discharge amount Q becomes small with reduction of specific discharge amount Q. In FIG. 21, curve line Z1 denotes a case where biasing force f of biasing member 58 is reduced by loosening adjustor plug 57, and curve line Z2 denotes a case where biasing force f of biasing member 58 is increased by tightening adjustor plug 57. Further, the control of biasing force f of biasing member 58 can be performed with a simple operation of moving adjustor plug 57 in an axial direction thereof. Therefore, it is possible to facilitate controlling the variation in specific discharge amount Q.

Figure 22:
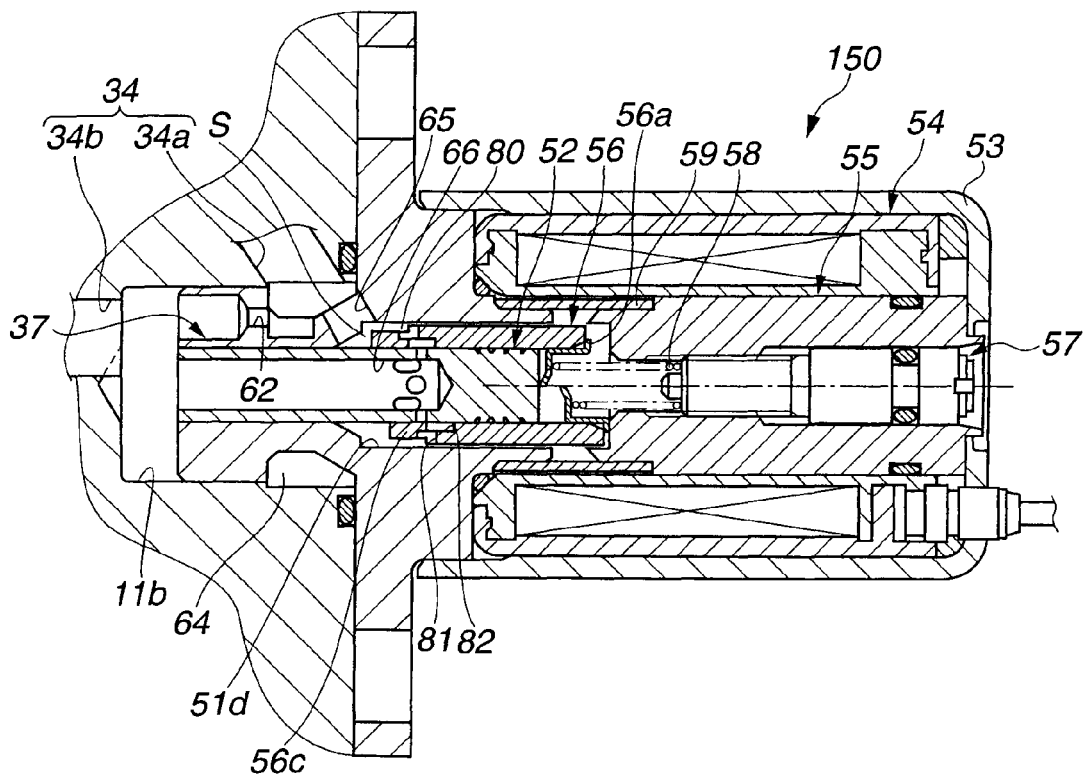
FIG. 22 is a partly enlarged diagram of FIG. 3, showing an entire construction of an electromagnetic valve according to a modification of the first embodiment.
Figure 23:
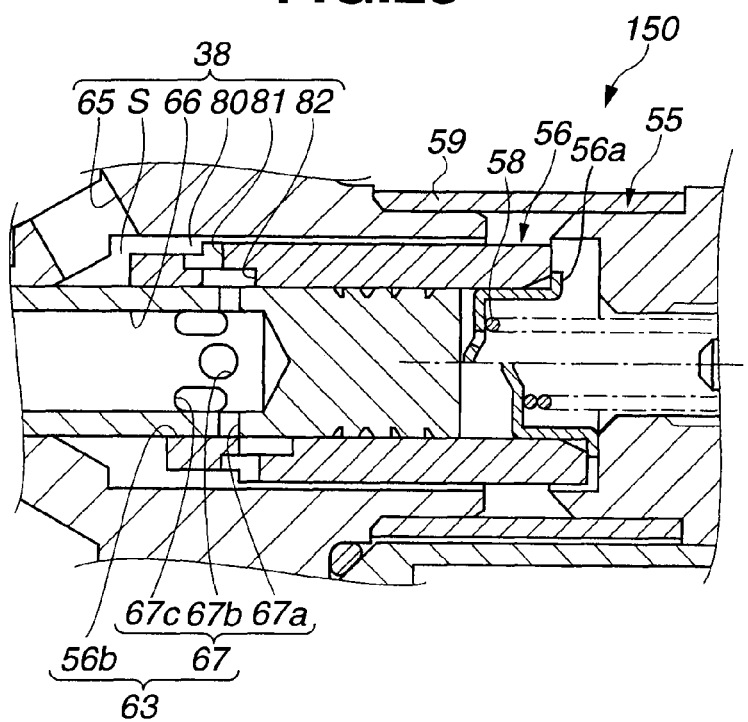
FIG. 23 is an enlarged diagram of FIG. 22, showing an essential part of the electromagnetic valve.
Figure 24:
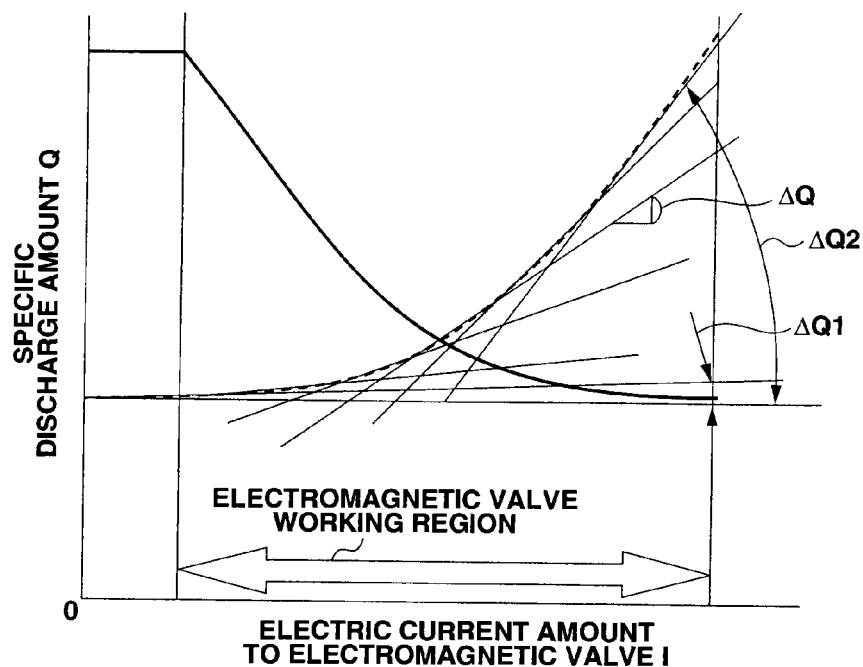
FIG. 24 is a graph showing a relationship between amount of electric current to be supplied to the electromagnetic valve and specific discharge amount of the variable displacement pump of the modification.

Referring to FIG. 22 to FIG. 24, a modification of the first embodiment will be explained hereinafter. The modification is constructed such that change in specific discharge amount Q with respect to electromagnetic valve current amount I has an inverse phase relative to that in the first embodiment, that is, such that specific discharge amount Q is gradually reduced with increase in electromagnetic valve current amount I. In FIG. 22 and FIG. 23, moveable core 56 in the most retreating position is shown on an upper side above a center line of electromagnetic valve 150, whereas moveable core 56 in the most advancing position is shown on a lower side below the center line of electromagnetic valve 150.

Electromagnetic valve 150 of this modification has the same basic construction as that of the first embodiment except for reduced diameter portion 56c of moveable core 56. As shown in FIG. 22 and FIG. 23, moveable core 56 has reduced diameter portion 56c on the rear end portion thereof which has a stepwisely reduced diameter. Annular oil passage 80 is defined in a radial clearance between reduced diameter portion 56c and moveable core accommodating portion 51d. That is, annular oil passage 80 is defined by an outer circumferential surface of reduced diameter portion 56c and an inner circumferential surface of moveable core accommodating portion 51d. Annular oil passage 80 is communicated with annular passage 64 via annular space S and communication hole 65.

Moveable core 56 has first annular groove 81 on an outer circumferential surface thereof in the vicinity of a base portion of reduced diameter portion 56c. First annular groove 81 continuously extends in a circumferential direction of moveable core 56. Further, moveable core 56 has second annular groove 82 on an inner circumferential surface thereof on a side of the rear end portion. Second annular groove 82 is formed to overlap with first annular groove 81 in radial and axial directions of moveable core 56 and thereby communicate with first annular groove 81.

Second annular groove 82 has a predetermined width extending in an axial direction of moveable core 56 and has a predetermined positional relation to valve holes 67a, 67b and 67c so as to be communicated with valve holes 67a, 67b and 67c as explained later. When second annular groove 82 is communicated with respective valve holes 67a, 67b and 67c, second oil passage 38 is formed by communication hole 65, annular space S, annular passage 80, first annular groove 81, second annular groove 82 and axial passage 66.

The communication between second annular groove 82 and respective valve holes 67a, 67b and 67c is explained in detail below. In this modification, valve holes 67a, 67b and 67c are arranged in the order inverse to the order in the first embodiment in the axial direction of valve body 52. That is, when moveable core 56 is in the most advancing position toward stationary core 55, all valve holes 67a, 67b and 67c are closed. In contrast, as moveable core 56 is moved to retreat and be apart from stationary core 55, small diameter valve holes 67a become opened and then intermediate diameter valve holes 67b and large diameter valve holes 67c become opened sequentially.

In this modification, as shown in FIG. 24, when electromagnetic valve current amount I reaches the maximum value in which electromagnetic valve stroke amount L is 0, all valve holes 67a, 67b and 67c become closed. As electromagnetic valve current amount I is decreased to thereby increase electromagnetic valve stroke amount L, the opening degrees of valve holes 67a, 67b and 67c, i.e., a flow passage sectional area of third orifice 63, is nonlinearly increased in the form of a generally quadratic curve. As a result, specific discharge amount Q is increased in the form of a generally quadratic curve. Thus, electromagnetic valve 150 according to this modification is constructed such that specific discharge amount Q is gradually decreased in the form of a generally quadratic curve with an increase in electromagnetic valve current amount I, as indicated in thick solid line in FIG. 24. A characteristic curve of specific discharge amount Q with respect to electromagnetic valve current amount I has an inverse phase relative to that in the first embodiment which is indicated in thick broken line in FIG. 24.

Accordingly, also in this modification, a rate of change in specific discharge amount Q (corresponding to gradient $\Delta Q$ of tangent line in the first embodiment as indicated in the broken line in FIG. 24) relative to electromagnetic valve current amount I under a condition that specific discharge amount Q is smaller (corresponding to gradient $\Delta Q1$ shown in FIG. 24) is reduced as compared to a rate of change in specific discharge amount Q relative thereto under a condition that specific discharge amount Q is larger (corresponding to gradient $\Delta Q2$ shown in FIG. 24). Therefore, this modification can perform the same function and effect as those of the first embodiment as indicated by gradient $\Delta Q1$.

Referring to FIG. 25 to FIG. 30, a second embodiment of the present invention will be explained hereinafter, which differs from the first embodiment in that electromagnetic valve 250 is constructed to have the above-described characteristic by using a resilient characteristic (i.e., Young's modulus) of biasing member 58 instead of the arrangement of valve holes 67 in the first embodiment. Like reference numerals denote like parts, and therefore, detailed explanations therefor are omitted.

Figure 26:
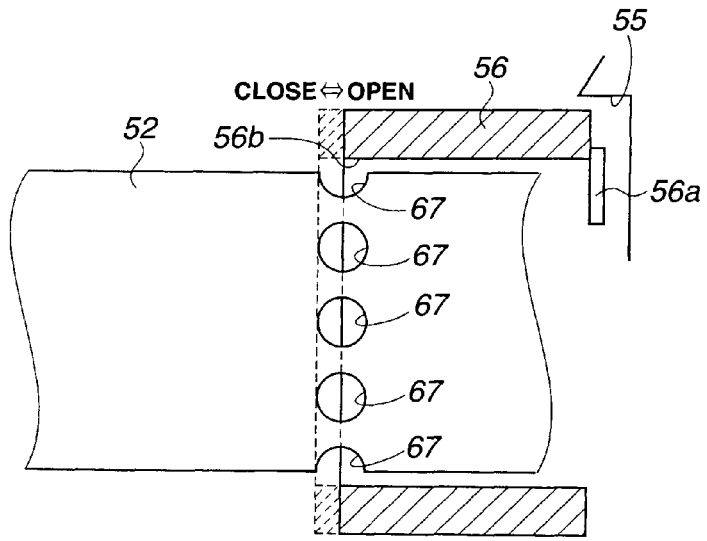
FIG. 26 is a schematic diagram showing arrangement and open/closed state of valve holes of the electromagnetic valve that is used in the variable displacement pump of the second embodiment.

In the second embodiment, as shown in FIG. 26, a plurality of valve holes 67 which have a same diameter and correspond to large diameter valve holes 67c in the first embodiment, are arranged in a predetermined position in the axial direction of valve body 52 and at the equivalent interval therebetween along the circumferential direction of valve body 52. When electromagnetic valve 250 is in the deenergized state, these valve holes 67 are fully closed by valve portion 56b of moveable core 56. When electromagnetic valve 250 is energized, valve holes 67 are sequentially opened as valve portion 56b of moveable core 56 is axially displaced.

Figure 25:
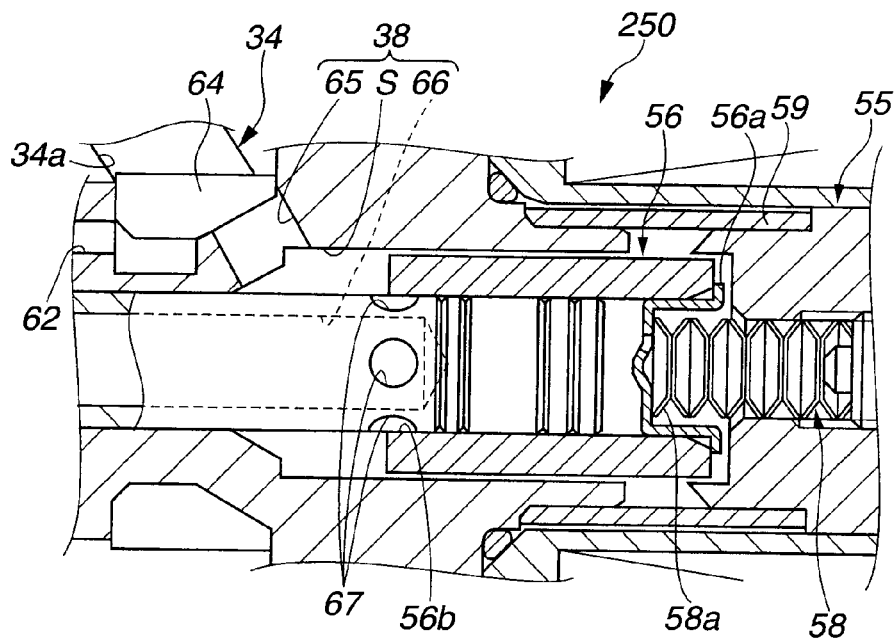
FIG. 25 is an enlarged longitudinal cross section of an electromagnetic valve according to a second embodiment of the present invention, showing an essential part of the electromagnetic valve.

Biasing member 58 is constructed as a member that has a nonlinear characteristic of Young's modulus, for instance, a disc spring, instead of a coil spring used in the first embodiment which has a linear characteristic of Young's modulus. In the second embodiment, as shown in FIG. 25, biasing member 58 is constituted of a plurality of disc springs 58a having a same shape. Disc springs 58a are coupled to each other in an axial direction thereof in such a manner that end portions thereof having a same diameter abut against each other.

Figure 27:
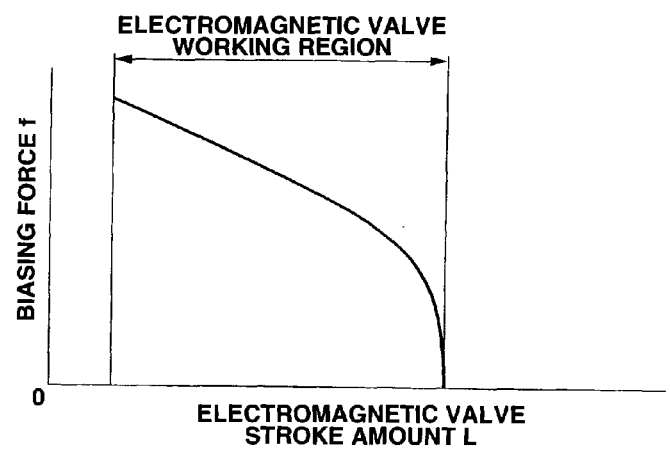
FIG. 27 is a graph showing a relationship between stroke amount of the electromagnetic valve and biasing force of a biasing member of the electromagnetic valve in the second embodiment.
Figure 28:
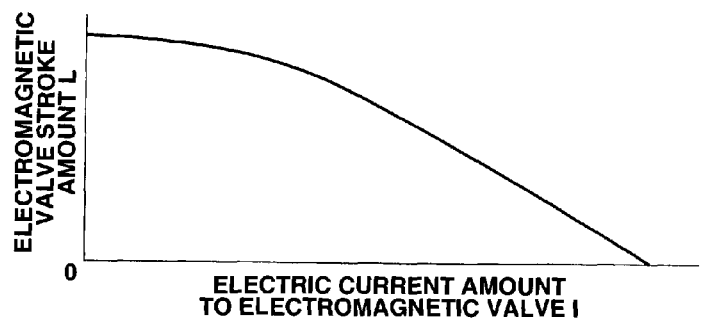
FIG. 28 is a graph showing a relationship between amount of electric current to be supplied to the electromagnetic valve and stroke amount of the electromagnetic valve in the second embodiment.
Figure 29:
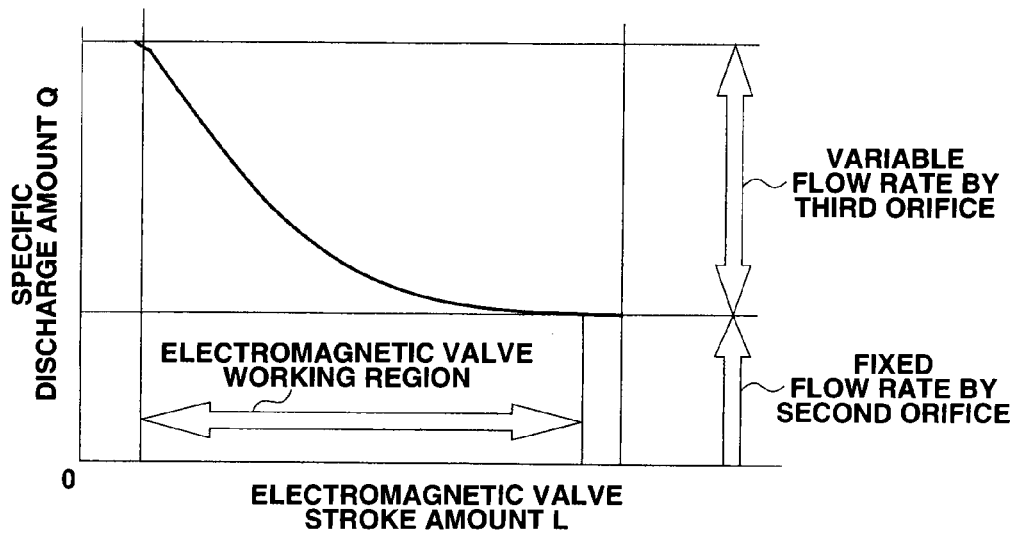
FIG. 29 is a graph showing a relationship between stroke amount of the electromagnetic valve and specific discharge amount of the variable displacement pump in the second embodiment.

Owing to the nonlinear characteristic of Young's modulus of biasing member 58, as shown in FIG. 27, biasing force f of biasing member 58 relative to an advancing movement of moveable core 56, i.e., relative to a decrease in electromagnetic valve stroke amount L, is increased nonlinearly in the form of a generally quadratic curve. Since electromagnetic valve attraction force F is constant with respect to electromagnetic valve stroke amount L similar to electromagnetic valve attraction force F in the first embodiment, variation in electromagnetic valve stroke amount L with respect to electromagnetic valve current amount I is indicated by a generally quadratic curve as shown in FIG. 28 on the basis of the above-described relationship between electromagnetic valve stroke amount L and biasing force f of biasing member 58.

In the second embodiment, when coil unit 54 of electromagnetic valve 250 is supplied with exciting current, moveable core 56 is displaced toward the side of stationary core 55 with a rate corresponding to the above-described nonlinear characteristic of electromagnetic valve stroke amount L on the basis of the relationship between electromagnetic valve current amount I and electromagnetic valve stroke amount L. At this time, valve holes 67 is gradually released from the closed state held by valve portion 56b of moveable core 56 having a displacement amount that is increased according to a generally quadratic curve, and thus valve holes 67 become opened. As a result, the opening degrees of valve holes 67, i.e., the flow passage sectional area of third orifice 63, is increased at a rate corresponding to a quadratic curve as seen from FIG. 29.

Figure 30:
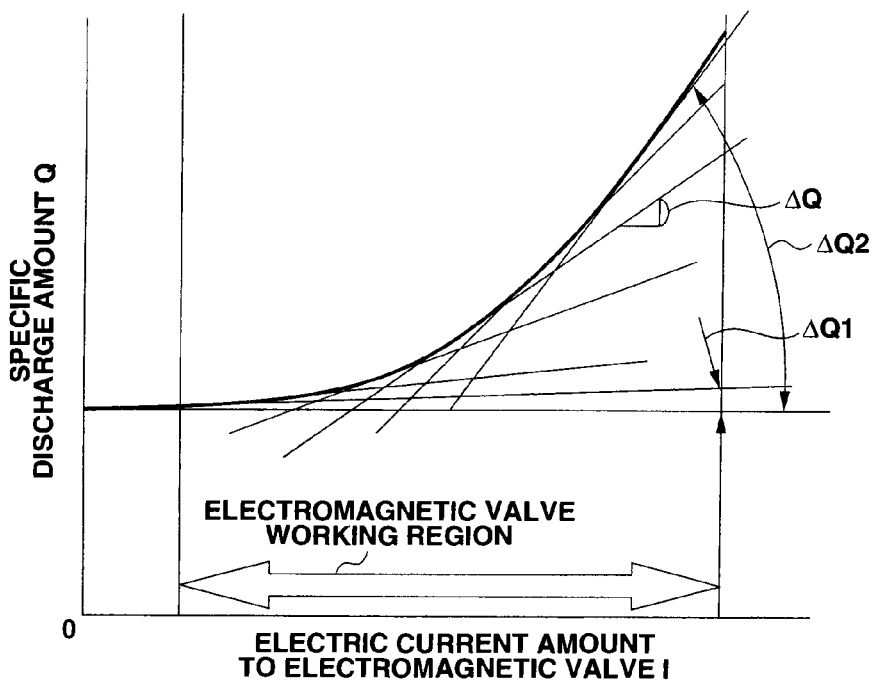
FIG. 30 is a graph showing a relationship between amount of electric current to be supplied to the electromagnetic valve and specific discharge amount of the variable displacement pump in the second embodiment.

In the second embodiment, specific discharge amount Q of oil pump 10 is increased in the form of a generally quadratic curve as electromagnetic valve current amount I is increased as indicated in thick solid line in FIG. 30. As seen from the characteristic curve of FIG. 30, a rate of change in specific discharge amount Q (i.e., gradient $\Delta Q$ of tangent line to the thick solid line curve as shown in FIG. 30) relative to electromagnetic valve current amount I under a condition that specific discharge amount Q is smaller as indicated by gradient $\Delta Q1$ is reduced as compared to a rate of change in specific discharge amount Q relative to electromagnetic valve current amount I under a condition that specific discharge amount Q is larger as indicated by gradient $\Delta Q2$. Further, the electric current amount to be supplied to electromagnetic valve 250 becomes larger with an increase in steering angle. Therefore, a rate of change in specific discharge amount Q relative to steering angle $\theta$ (i.e., steering amount) under a condition that specific discharge amount Q is smaller is reduced as compared to a rate of change in specific discharge amount relative to steering angle $\theta$ under a condition that specific discharge amount Q is larger.

Accordingly, the second embodiment can perform the same function and effect as those of the first embodiment. In addition, in the second embodiment, it is possible to modify a rate of change in specific discharge amount Q of oil pump 10 by only varying Young's modulus of biasing member 58. Therefore, in the second embodiment, it is advantageous to readily achieve modification in design.

Referring to FIG. 31 to FIG. 36, there is shown a third embodiment of the present invention, which differs from the second embodiment in that electromagnetic valve 350 is constructed to have the above-described characteristic by using shapes of the magnetic poles of stationary core 55 and moveable core 56 instead of the resilient characteristic of biasing member 58 of the second embodiment. Like reference numerals denote like parts, and therefore, detailed explanations therefor are omitted.

Figure 31:
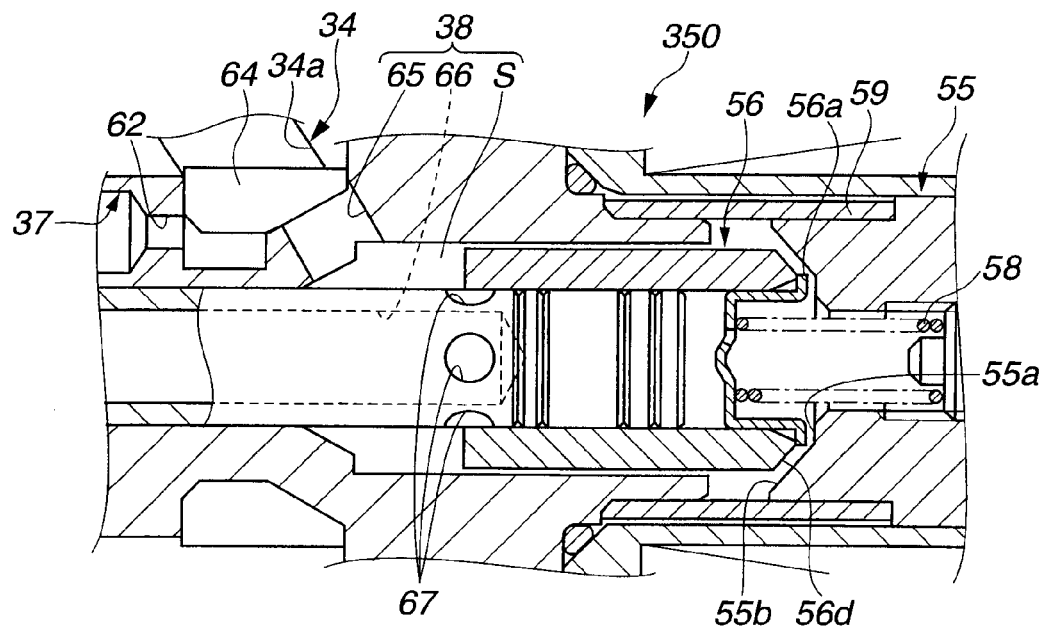
FIG. 31 is an enlarged longitudinal cross-section of an electromagnetic valve according to a third embodiment of the present invention, showing an essential part of the electromagnetic valve.
Figure 32:
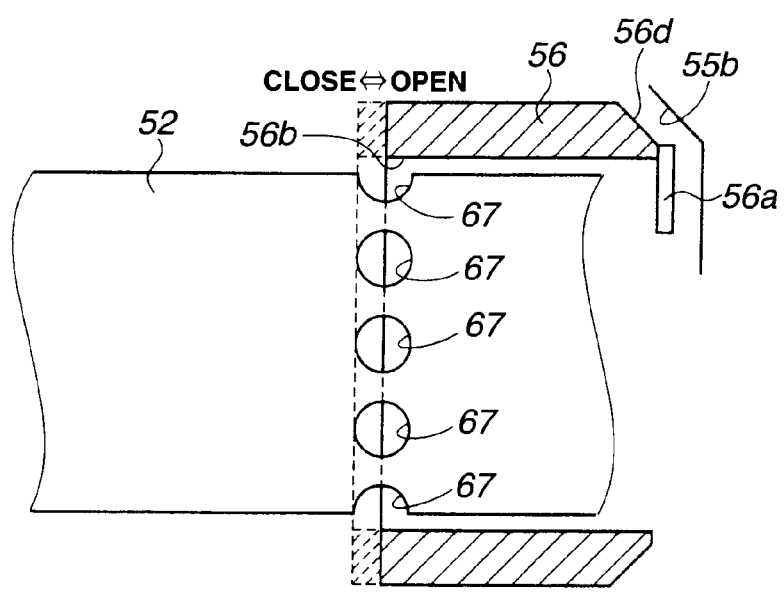
FIG. 32 is a schematic diagram showing arrangement and open/closed state of valve holes of the electromagnetic valve that is used in the variable displacement pump of the third embodiment.

In the third embodiment, the same coil spring as described in the first embodiment is used as biasing member 58 but mutually opposed end portions of stationary core 55 and moveable core 56, i.e., the respective magnetic poles of stationary core 55 and moveable core 56, are formed into a tapered shape as shown in FIG. 31 and FIG. 32. Specifically, tapered surface 55b is formed on a radial outside of engaging portion 55a on the axial end surface of stationary core 55. Tapered surface 56d is formed on a radial outside of the axial end surface of the tip end portion of moveable core 56 so as to have a tapered shape corresponding to tapered surface 55b of stationary core 55 in the axial direction of moveable core 56. Specifically, tapered surface 55b of stationary core 55 and tapered surface 56d of moveable core 56 are opposed to each other in substantially parallel relation.

Since the respective magnetic poles located on the opposed axial end portions of stationary core 55 and moveable core 56 have the tapered shape as described above, variation in electromagnetic valve attraction force F with respect to electromagnetic valve current amount I is nonlinearly indicated by a generally quadratic curve as shown in FIG. 33. In FIG. 33, as solid lines are thickened, electromagnetic valve current amount I is increased. Further, similar to the first embodiment, biasing force f of biasing member 58 is linearly increased as electromagnetic valve stroke amount L is reduced. Variation in electromagnetic valve stroke amount L with respect to electromagnetic valve current amount I is indicated by a generally quadratic curve as shown in FIG. 34 on the basis of the above-described relationship between electromagnetic valve attraction force F and electromagnetic valve current amount I.

In the third embodiment, when coil unit 54 of electromagnetic valve 350 is supplied with exciting current, moveable core 56 is displaced toward the side of stationary core 55 at a rate corresponding to the above-described nonlinear characteristic of electromagnetic valve stroke amount L, on the basis of the relationship between electromagnetic valve current amount I and electromagnetic valve stroke amount L. At this time, valve holes 67 are gradually released from the closed state held by valve portion 56b of moveable core 56 moveable with a displacement amount that is increased according to the generally quadratic curve with respect to electromagnetic valve current amount I, and thus valve holes 67 become opened. As a result, the opening degrees of valve holes 67, i.e., the flow passage sectional area at third orifice 63, is increased at a rate corresponding to a generally quadratic curve as seen from FIG. 35.

Figure 36:
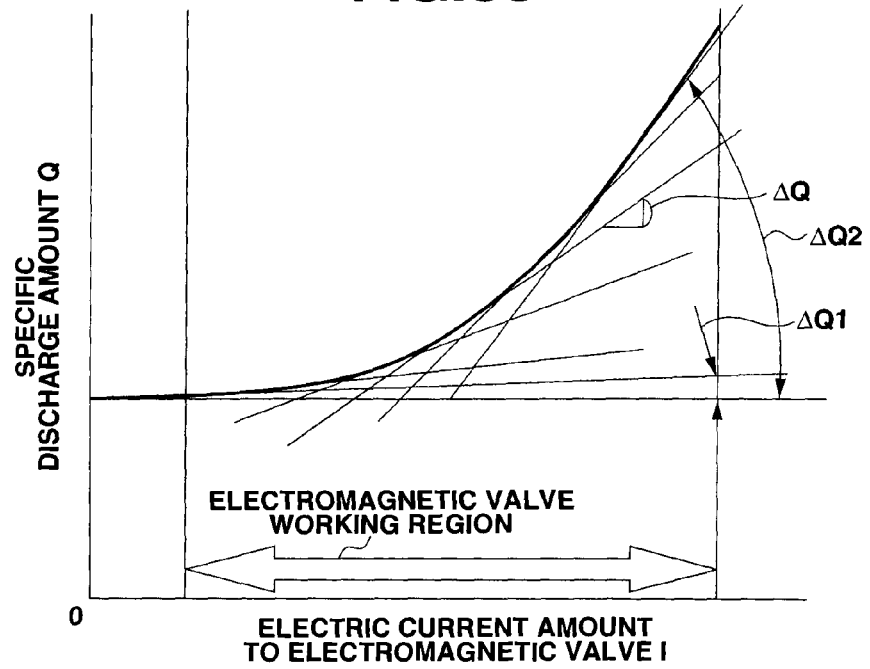
FIG. 36 is a graph showing a relationship between amount of electric current to be supplied to the electromagnetic valve and specific discharge amount of the variable displacement pump in the third embodiment.

In the third embodiment, as electromagnetic valve current amount I is increased, specific discharge amount Q of oil pump 10 is increased according to a generally quadratic curve as indicated in thick solid line in FIG. 36. As seen from the thick solid line curve of FIG. 36, a rate of change in specific discharge amount Q (i.e., gradient ΔQ of tangent line to the thick solid line curve as shown in FIG. 36) relative to electromagnetic valve current amount I under a condition that specific discharge amount Q is smaller as indicated by gradient ΔQ1 is reduced as compared to a rate of change in specific discharge amount Q relative to electromagnetic valve current amount I under a condition that specific discharge amount Q is larger as indicated by gradient ΔQ2. Further, the electric current amount to be supplied to electromagnetic valve 350 becomes larger with an increase in steering angle. Therefore, a rate of change in specific discharge amount Q relative to steering angle θ (i.e., steering amount) under a condition that specific discharge amount Q is smaller is reduced as compared to a rate of change in specific discharge amount Q relative to steering angle θ under a condition that specific discharge amount Q is larger.

Accordingly, the third embodiment can perform the same function and effect as those of the first embodiment by controlling electromagnetic valve attraction force F so as to vary according to the nonlinear curve with respect to electromagnetic valve current amount I. In addition, in the third embodiment, it is possible to modify a rate of change in specific discharge amount Q of oil pump 10 by only varying a taper angle of the respective magnetic poles of stationary core 55 and moveable core 56. Therefore, in the third embodiment, it is advantageous to readily achieve modification in design of electromagnetic valve 350.

Figure 37:
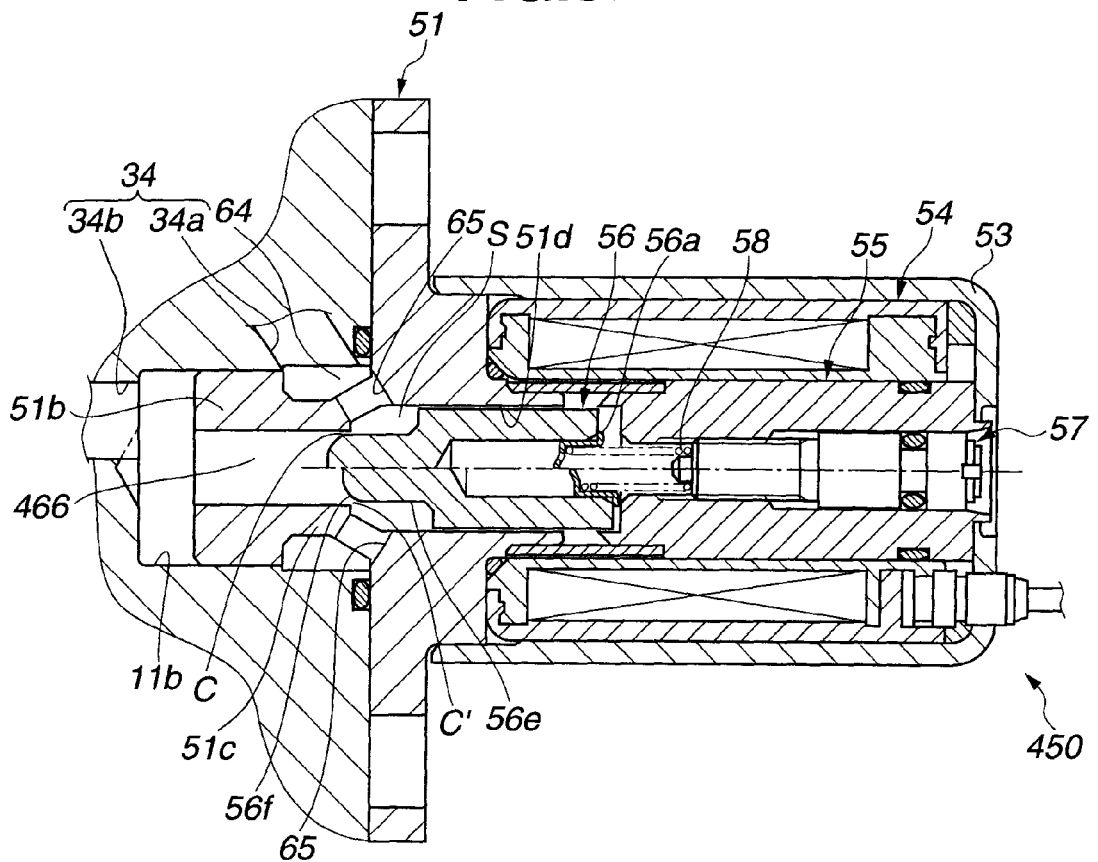
FIG. 37 is a longitudinal cross section of an electromagnetic valve that is used in the variable displacement pump according to a fourth embodiment of the present invention, showing an entire construction of the electromagnetic valve.
Figure 38:
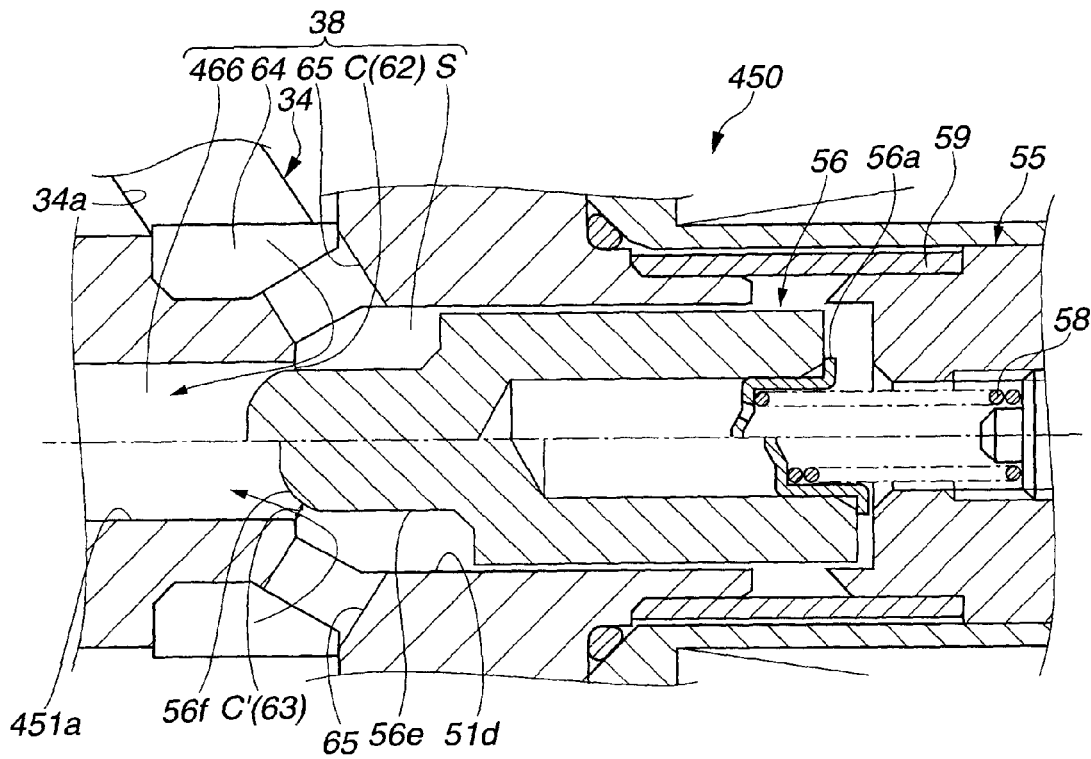
FIG. 38 is an enlarged diagram of FIG. 37, showing an essential part of the electromagnetic valve.
Figure 39:
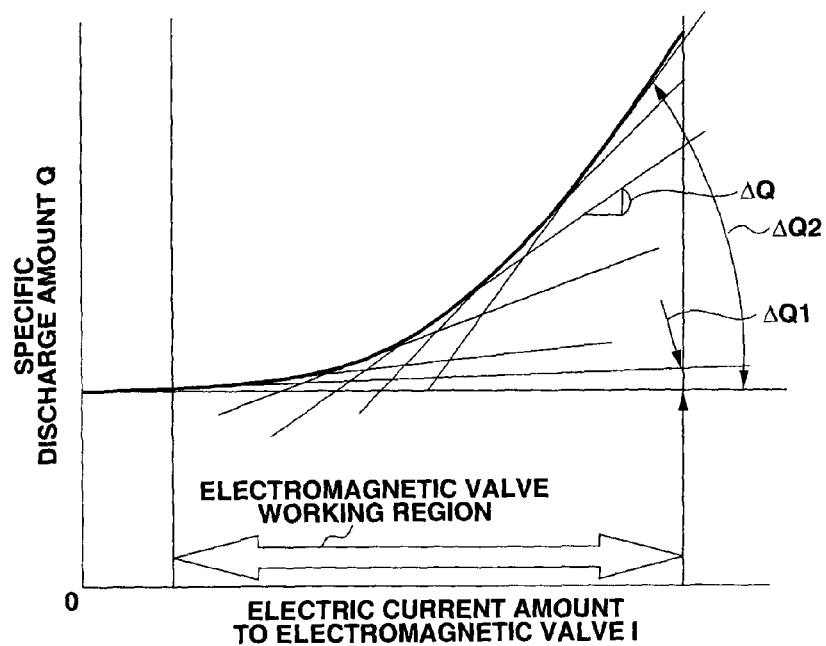
FIG. 39 is a graph showing a relationship between amount of electric current to be supplied to the electromagnetic valve and specific discharge amount of the variable displacement pump in the fourth embodiment.

Referring to FIG. 37 to FIG. 39, there is shown a fourth embodiment which differs from the first embodiment in that valve body 52 and first oil passage 37 are omitted and second orifice 62 and third orifice 63 are formed by valve housing 51 and moveable core 56. In FIG. 37 and FIG. 38, moveable core 56 in the most retreating position is shown on an upper side above a center line of electromagnetic valve 450, whereas moveable core 56 in the most advancing position is shown on a lower side below the center line of electromagnetic valve 450. Like reference numerals denote like parts, and therefore, detailed explanations therefor are omitted.

As shown in FIG. 37, moveable core 56 has an increased axial length as compared to that of the first embodiment. Moveable core 56 has reduced diameter portion 56e at a rear closed end portion thereof which is stepwisely reduced in diameter. Moveable core 56 is configured such that a tip end portion of reduced diameter portion 56e is received in valve portion receiving bore 466 of valve housing 51 when moveable core 56 is placed in the most retreating position. In the fourth embodiment, the tip end portion of reduced diameter portion 56e acts as valve portion 56b of moveable core 56 of the first embodiment, and valve portion receiving bore 466 is formed in valve housing 51 instead of valve body accommodating bore 51a in the first embodiment and serves as axial passage 66 in the first embodiment.

As shown in FIG. 38, reduced diameter portion 56e has an outer diameter slightly smaller than an inner diameter of valve portion receiving bore 466. When moveable core 56 is placed in the most retreating position, predetermined fine radial clearance C is formed between an outer circumferential surface of reduced diameter portion 56e and wall portion 451a of valve housing 51 which defines valve portion receiving bore 466. Radial clearance C has a predetermined sectional area and serves as a passage for the pump discharge oil. In FIG. 38, flows of the pump discharge oil are indicated by arrows.

In the fourth embodiment, second oil passage 38 is constituted of communication hole 65, annular space S defined by reduced diameter portion 56e within moveable core accommodating portion 51d, radial clearance C and valve portion receiving bore 466. Further, second orifice 62 as the fixed orifice is formed by radial clearance C as the passage for the pump discharge oil.

Reduced diameter portion 56e of moveable core 56 has spherical portion 56f at the tip end portion which is received in valve portion receiving bore 466 when moveable core 56 is placed in the most retreating position. Spherical portion 56f has a predetermined radius and an arcuate shape in vertical cross section through an axial center thereof. When moveable core 56 is displaced toward stationary core 55, radial clearance C' is formed between spherical portion 56f and a part of wall portion 451a which defines a peripheral edge of an axial end of valve portion receiving bore 466. Radial clearance C' serves as a passage for the pump discharge oil which has a sectional area gradually increasing with the displacement of moveable core 56 toward stationary core 55 owing to a tapered shape of spherical portion 56f. Thus, third orifice 63 as the variable orifice is formed by radial clearance C' as the passage for the pump discharge oil.

With the above-described construction, when coil unit 54 of electromagnetic valve 450 is supplied with exciting current, moveable core 56 is displaced toward stationary core 55 with a stroke amount that linearly varies with respect to the electric current amount to be supplied to coil unit 54. Owing to the shape of spherical portion 56f of moveable core 56, variation in opening degree of the flow passage sectional area of third orifice 63 with respect to variation in electromagnetic valve stroke amount L, i.e., variation in specific discharge amount Q with respect to variation in electromagnetic valve current amount I, is indicated by a generally quadratic curve as shown in FIG. 39.

In the fourth embodiment, as electromagnetic valve current amount I is increased, specific discharge amount Q of oil pump 10 is increased according to a generally quadratic curve as indicated in thick solid line in FIG. 39. As seen from FIG. 39, a rate of change in specific discharge amount Q (i.e., gradient ΔQ of tangent line to the thick solid line curve as shown in FIG. 39) relative to electromagnetic valve current amount I under a condition that specific discharge amount Q is smaller as indicated by gradient ΔQ1 is reduced as compared to a rate of change in specific discharge amount Q relative to electromagnetic valve current amount I under a condition that specific discharge amount Q is larger as indicated by gradient ΔQ2. Further, the electric current amount to be supplied to electromagnetic valve 450 becomes larger with an increase in steering angle. Therefore, a rate of change in specific discharge amount Q relative to steering angle θ (i.e., steering amount) under a condition that specific discharge amount Q is smaller is reduced as compared to a rate of change in specific discharge amount Q relative to steering angle θ under a condition that specific discharge amount Q is larger.

Accordingly, the fourth embodiment can perform the same function and effect as those of the first embodiment. In addition, in the fourth embodiment, the number of parts can be reduced by omitting valve body 52 used in the first embodiment, and the number of machining processes can be reduced by omitting first oil passage 37. As a result, it is possible to reduce a manufacturing cost of the oil pump. Furthermore, a rate of change in specific discharge amount Q can be modified by merely varying the radius of spherical portion 56f of moveable core 56. Therefore, in the fourth embodiment, it is advantageous to readily achieve modification in design of electromagnetic valve 450.

The present invention is not limited to the above-described embodiments and modification thereof. For instance, the layout of electromagnetic valves 50, 150, 250, 350 and 450 and the arrangement of first oil passage 37 and second oil passage 38 within electromagnetic valves 50, 150, 250, 350 and 450 can be optionally modified depending on specifications of power steering apparatus and vehicles to which the oil pump of the present invention is to be applied.

Further, although steering angular speed is calculated by differentiating a value of steering angle detected by steering angle sensor 71 in the above-described embodiments and modification, the steering angular speed may be directly detected by a steering angular speed sensor that detects or estimates steering angular speed of the steering wheel.

This application is based on a prior Japanese Patent Application No. 2009-33412 filed on Feb. 17, 2009. The entire contents of the Japanese Patent Application No. 2009-33412 are hereby incorporated by reference. Although the invention has been described above by reference to certain embodiments of the invention and modifications of the embodiments, the invention is not limited to the embodiments and modifications described above. Further variations of the embodiments and modifications described above will occur to those skilled in the art in light of the above teachings. The scope of the invention is defined with reference to the following claims.

What is claimed is:

1. A variable displacement pump for supplying a working fluid to a steering apparatus for a vehicle, the variable displacement pump comprising:

a pump housing including a pump element accommodating portion therein;

a drive shaft rotatably supported by the pump housing;

a cam ring disposed within the pump element accommodating portion to be eccentrically moveable with respect to an axis of the drive shaft;

a pump element disposed on an inner circumferential side of the cam ring, the pump element being driven by the drive shaft to suck, pressurize and discharge the working fluid and vary a specific discharge amount of the working fluid which is a discharge flow rate per one rotation of the pump element in accordance with variation in an eccentric amount of the cam ring with respect to the axis of the drive shaft, a suction port that is disposed within the pump housing and opened to a suction area of the pump element;

a discharge port that is disposed within the pump housing and opened to a discharge area of the pump element; and a solenoid that is drivingly controlled based on variation in an electric current amount to be supplied to the solenoid which is controlled in accordance with an operating condition of the vehicle, the solenoid being configured to control the eccentric amount of the cam ring, wherein the solenoid is configured such that a rate of change in the specific discharge amount relative to the electric current amount to be supplied to the solenoid under a condition that the specific discharge amount is smaller is reduced compared to a rate of change in the specific discharge amount relative to the electric current amount to be supplied to the solenoid under a condition that the specific discharge amount is larger, a variable orifice disposed in a discharge passage connected to the discharge port, the variable orifice being configured to variably control a flow passage sectional area of the discharge passage with an axial displacement of an armature of the solenoid, and a control valve disposed within the pump housing and configured to control a control pressure for controlling the eccentric amount of the cam ring based on of a pressure difference between an upstream side of the variable orifice and a downstream side of the variable orifice, wherein the variable orifice is configured such that variation in the flow passage sectional area with respect to the axial displacement of the armature of the solenoid has a nonlinear characteristic, wherein the variable orifice comprises a plurality of orifices disposed in the discharge passage, and a valve portion that varies an amount of overlap with the plurality of orifices in accordance with the axial displacement of the armature of the solenoid, and the plurality of orifices include at least two orifices which are different in diameter from each other, wherein the plurality of orifices are arranged along a direction of the axial displacement of the armature in order of sizes of diameters thereof, and the plurality of orifices are arranged such that as the valve portion is displaced relative to the plurality of orifices from a side of the orifice having a large diameter toward a side of the orifice having a small diameter, the flow passage sectional area of the variable orifice being decreased to thereby reduce the specific discharge amount.

2. A variable displacement pump for supplying a working fluid to a steering apparatus for a vehicle, the variable displacement pump comprising:

a pump housing including a pump element accommodating portion therein;

a drive shaft rotatably supported by the pump housing;

a cam ring disposed within the pump element accommodating portion to be eccentrically moveable with respect to an axis of the drive shaft;

a pump element disposed on an inner circumferential side of the cam ring, the pump element being driven by the drive shaft to suck, pressurize and discharge the working fluid and vary a specific discharge amount of the working fluid which is a discharge flow rate per one rotation of the pump element in accordance with variation in an eccentric amount of the cam ring with respect to the axis of the drive shaft, a suction port that is disposed within the pump housing and opened to a suction area of the pump element;

a discharge port that is disposed within the pump housing and opened to a discharge area of the pump element; and a solenoid that is drivingly controlled based on variation in an electric current amount to be supplied to the solenoid which is controlled in accordance with an operating condition of the vehicle, the solenoid being configured to control the eccentric amount of the cam ring, wherein the solenoid is configured such that a rate of change in the specific discharge amount relative to the electric current amount to be supplied to the solenoid under a condition that the specific discharge amount is smaller is reduced compared to a rate of change in the specific discharge amount relative to the electric current amount to be supplied to the solenoid under a condition that the specific discharge amount is larger; and further comprising:

a variable orifice disposed in a discharge passage connected to the discharge port, the variable orifice having a flow passage sectional area that is variably controlled by the solenoid, a control valve disposed within the pump housing and configured to control a control pressure for controlling the eccentric amount of the cam ring based on a pressure difference between an upstream side of the variable orifice and a downstream side of the variable orifice, and a fixed orifice disposed in the discharge passage in parallel relation to the variable orifice, the fixed orifice having a non-variable flow passage sectional area.

* * * * *